United States Patent
Jeon et al.

(10) Patent No.: US 9,407,330 B2
(45) Date of Patent: Aug. 2, 2016

(54) MOBILE TERMINAL, HOME APPLIANCE AND METHOD FOR OPERATING THE SAME

(71) Applicant: LG Electronics Inc., Seoul (KR)

(72) Inventors: Chansung Jeon, Seoul (KR); Sangbae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 14/043,537

(22) Filed: Oct. 1, 2013

(65) Prior Publication Data

US 2014/0106672 A1    Apr. 17, 2014

(30) Foreign Application Priority Data

Oct. 4, 2012 (KR) .................. 10-2012-0110230

(51) Int. Cl.
*H04B 5/00* (2006.01)

(52) U.S. Cl.
CPC ..................... *H04B 5/0031* (2013.01)

(58) Field of Classification Search
CPC .. H04B 5/0025; H04B 5/0031; H04B 5/0062; H04B 5/02; H04L 12/2803; H04L 12/282; H04L 12/2827; H04L 12/2642; H04L 12/2807
See application file for complete search history.

(56) References Cited

U.S. PATENT DOCUMENTS

| | | | | |
|---|---|---|---|---|
| 6,108,693 A | * | 8/2000 | Tamura | G06F 15/167 709/213 |
| 2008/0065587 A1 | * | 3/2008 | Iwasaki | G06F 3/0614 |
| 2008/0130520 A1 | * | 6/2008 | Ebrom | G06F 9/54 370/254 |
| 2009/0072951 A1 | * | 3/2009 | Alberth et al. | 340/10.41 |
| 2011/0032072 A1 | * | 2/2011 | Han et al. | 340/5.1 |
| 2012/0023561 A1 | * | 1/2012 | Saida | G06F 21/31 726/6 |
| 2012/0322374 A1 | * | 12/2012 | Yamaoka | H01Q 1/125 455/41.1 |
| 2013/0069794 A1 | * | 3/2013 | Terwilliger et al. | 340/815.45 |
| 2013/0203346 A1 | * | 8/2013 | Han | 455/41.1 |
| 2013/0282592 A1 | * | 10/2013 | Zambrana | G06Q 30/012 705/302 |
| 2014/0087660 A1 | * | 3/2014 | Kim et al. | 455/41.1 |
| 2014/0087661 A1 | * | 3/2014 | Kim et al. | 455/41.1 |
| 2014/0300450 A1 | * | 10/2014 | Ha et al. | 340/6.1 |

FOREIGN PATENT DOCUMENTS

| | | |
|---|---|---|
| CN | 1343806 A | 4/2002 |
| CN | 102301353 A | 12/2011 |
| CN | 102449915 A | 5/2012 |
| WO | 2012-073512 A1 | 6/2012 |
| WO | 2012073512 A1 | 6/2012 |

* cited by examiner

*Primary Examiner* — Andrew Wendell
(74) *Attorney, Agent, or Firm* — Dentons US LLP

(57) ABSTRACT

A mobile terminal, a home appliance and a method for operating the same are disclosed. The method for operating the mobile terminal includes displaying a product registration screen, performing tagging to a home appliance, receiving product information of the home appliance from the home appliance based on the tagging, and transmitting the product information to a server. Accordingly, it is possible to conveniently perform product registration of the home appliance.

11 Claims, 28 Drawing Sheets

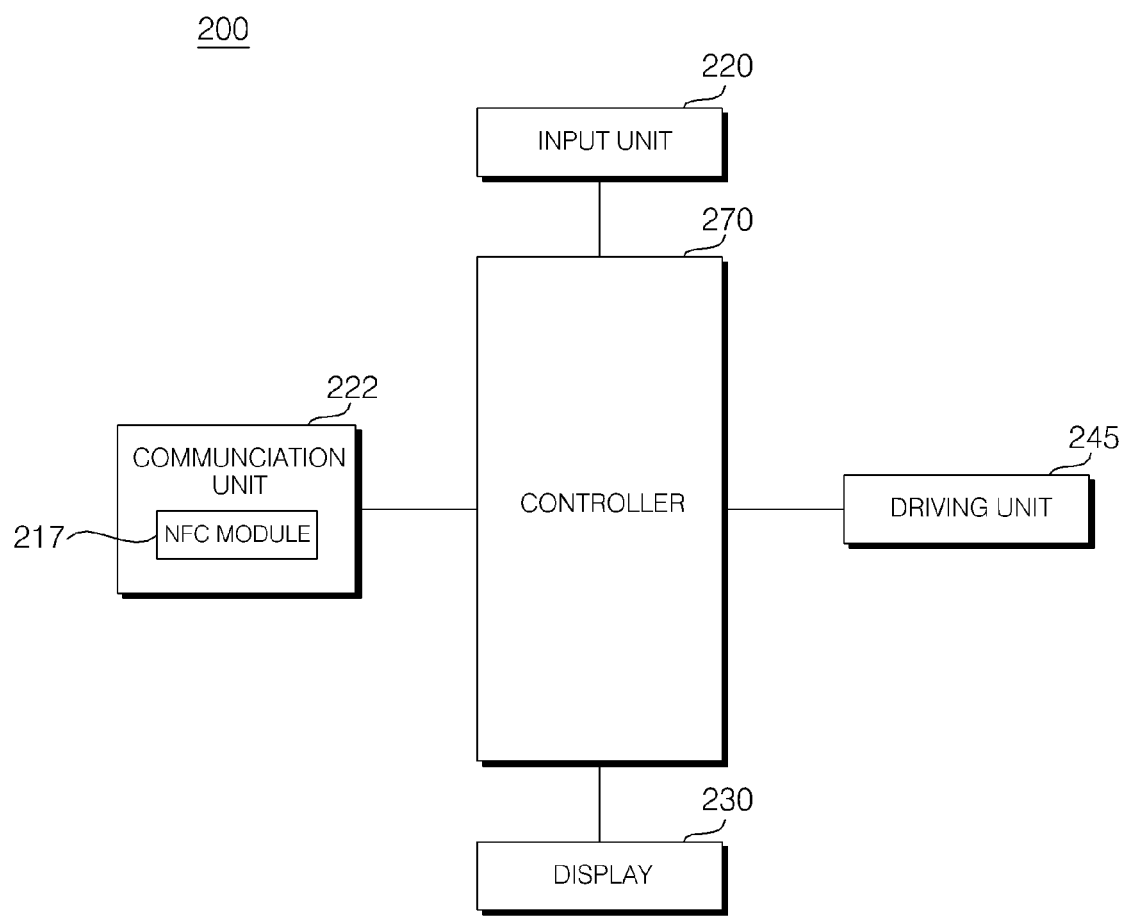

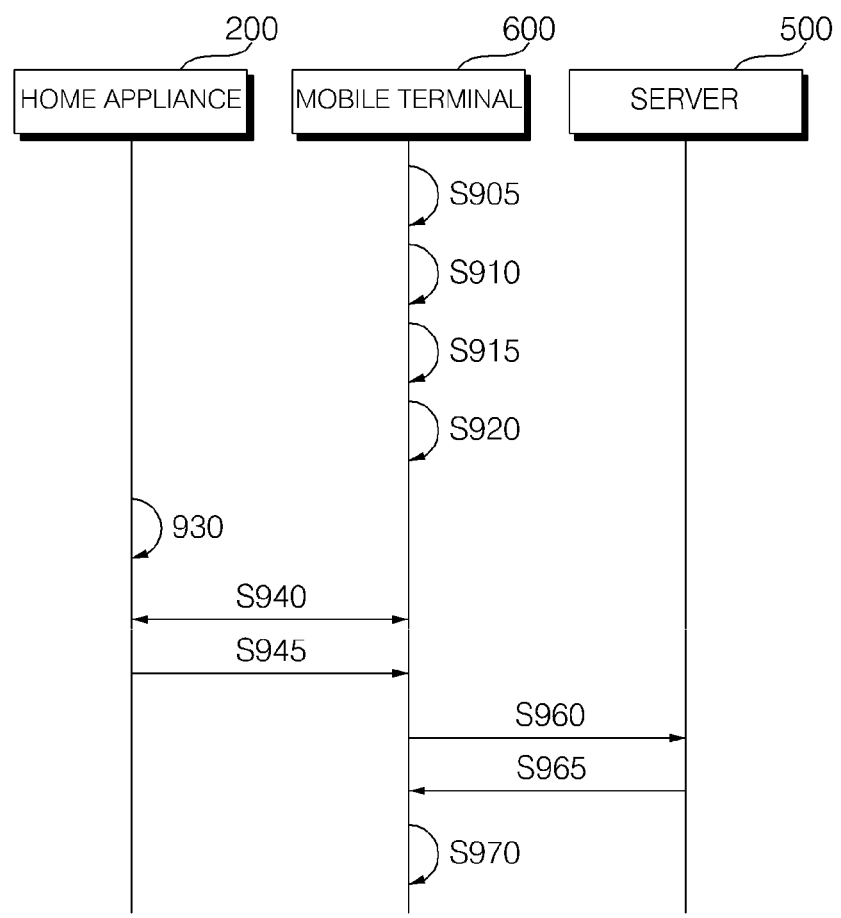

MOBILE TERMINAL, HOME APPLIANCE AND METHOD FOR OPERATING THE SAME

CROSS-REFERENCE TO RELATED APPLICATION

This application claims the priority benefit of Korean Patent Application No. 10-2012-0110230, filed on Oct. 4, 2012, in the Korean Intellectual Property Office, the disclosure of which is incorporated herein by reference.

BACKGROUND OF THE INVENTION

1. Field of the Invention

The present invention relates to a mobile terminal, a home appliance and a method for operating the same, and more particularly to a mobile terminal, a home appliance and a method for operating the same, which are capable of conveniently performing product registration of the home appliance.

2. Description of the Related Art

Among home appliances provided in a building, a refrigerator stores food, a laundry processing machine processes laundry, an air conditioner adjusts indoor temperature, and a cooker cooks food.

As various communication methods have been developed, a variety of research in hopes of increasing user convenience in terms of communication with a home appliance has been conducted.

SUMMARY OF THE INVENTION

Therefore, the present invention has been made in view of the above problems, and it is an object of the present invention to provide a mobile terminal, a home appliance and a method for operating the same, which are capable of conveniently performing product registration of the home appliance.

In accordance with an aspect of the present invention, the above and other objects can be accomplished by the provision of a method for operating a mobile terminal including displaying a product registration screen, performing tagging to a home appliance, receiving product information of the home appliance from the home appliance based on the tagging, and transmitting the product information to a server.

In accordance with another aspect of the present invention, there is provided a method for operating a home appliance including storing product information of the home appliance, performing tagging to a mobile terminal, and transmitting stored product information to the mobile terminal based on the tagging.

In accordance with another aspect of the present invention, there is provided a mobile terminal including a display configured to display a product registration screen, a near field communication (NFC) module configured to receive product information of a home appliance by tagging to the home appliance, a communication module configured to perform data communication with a server, and a controller configured to control transmission of the product information to the server.

In accordance with another aspect of the present invention, there is provided a home appliance including a driving unit, a controller configured to control the driving unit, and a near field communication (NFC) module configured to store product information of the home appliance and to transmit pre-stored product information to a mobile terminal upon tagging to the mobile terminal.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a block diagram showing the internal configuration of an example of a home appliance of FIG. 1;

FIG. 9 is a diagram further describing the operating method of FIG. 7 or 8.

DETAILED DESCRIPTION OF THE PREFERRED EMBODIMENTS

Exemplary embodiments of the present invention will be described with reference to the attached drawings.

The terms "module" and "unit" used in description of components are used herein to aid in the understanding of the components and thus should not be misconstrued as having specific meanings or roles. Accordingly, the terms "module" and "unit" may be used interchangeably.

Figure 1:
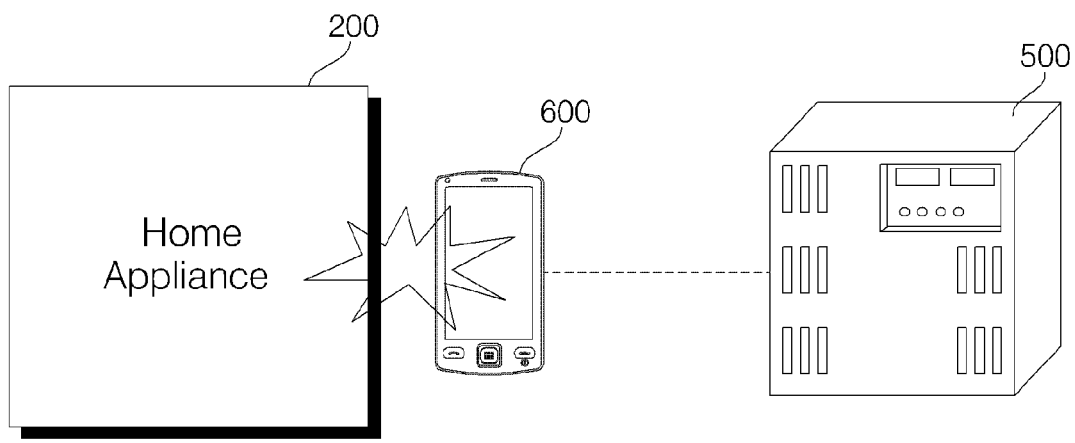
FIG. 1 is a diagram showing an example of a communication system according to an embodiment of the present invention.

FIG. 1 is a diagram showing an example of a communication system according to an embodiment of the present invention.

Referring to FIG. 1, the communication system 10 according to the embodiment of the present invention may include a home appliance 200, a mobile terminal 600 and a server 500.

In particular, in the embodiment of the present invention, the home appliance 200 and the mobile terminal 600 may perform near field communication (NFC).

For NFC, the home appliance 200 may store home appliance product information in an NFC module in a power-on state.

The product information may include product type information (a refrigerator, a washing machine, etc.), product manufacture date information, product serial number, and type/version information of firmware installed in a product, etc. of the home appliance.

The mobile terminal 600 may transmit the product information received from the home appliance 200 to the server 500 and receive product registration result information. Accordingly, using NFC and the mobile terminal 600, it is possible to easily perform product registration of the home appliance and to easily confirm a product registration result.

The home appliance 200 and the mobile terminal 600 may transmit or receive home appliance related information in addition to the product information.

The home appliance 200 may frequently store the home appliance related information in a power-on state.

Thereafter, if the mobile terminal 600 is tagged to the home appliance 200, the stored home appliance information, e.g., state information, may be transmitted to the mobile terminal 600 via NFC.

The state information may include operation period information, current operation time information, remaining operation time information, current operation type information, etc. if the home appliance currently operates.

The state information may include information about a part which does not operate upon failure, failure time information, operation information upon failure, etc., if the home appliance has failed.

The state information may include power consumption information, cost information based on power consumption, etc.

The home appliance 200 is an electronic device used by a user and may include a refrigerator 200a, a washing machine 200b, an air conditioner 200c, a cooker 200d, a cleaner 200e, etc., for example. The home appliance may further include a TV, etc.

The mobile terminal 600 may include a mobile phone, a smartphone, a laptop, a tablet PC, etc.

FIGS. 2a to 2e are diagrams illustrating various examples of near field communication (NFC) between a mobile terminal and a home appliance.

Figure 2A:
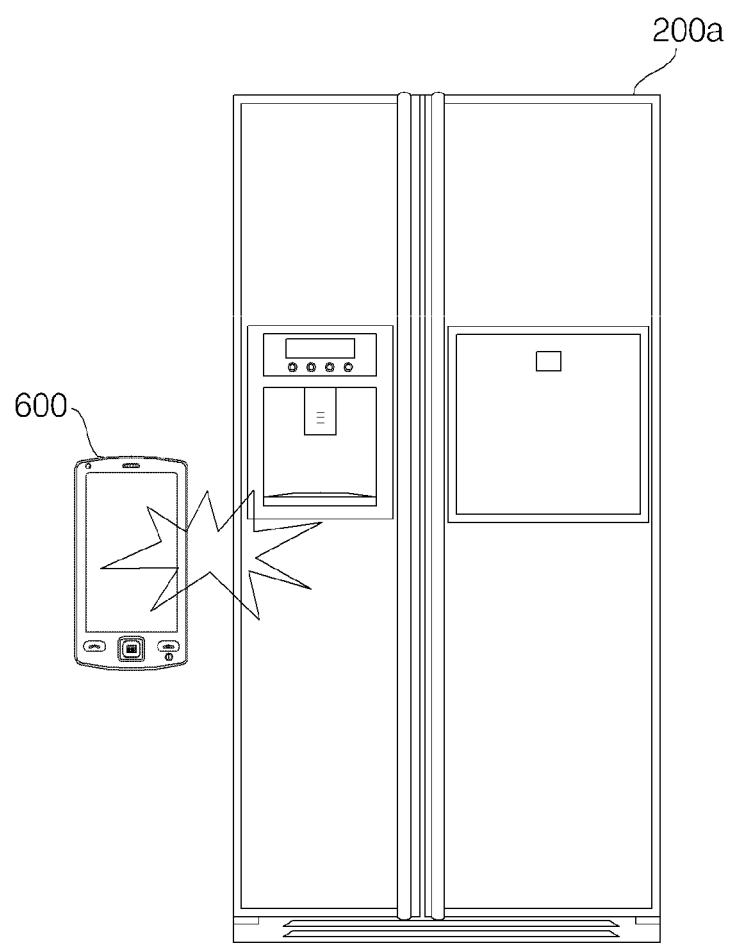
FIG. 2A is a diagram illustrating various examples of near field communication (NFC) between a mobile terminal and a home appliance.
Figure 2B:
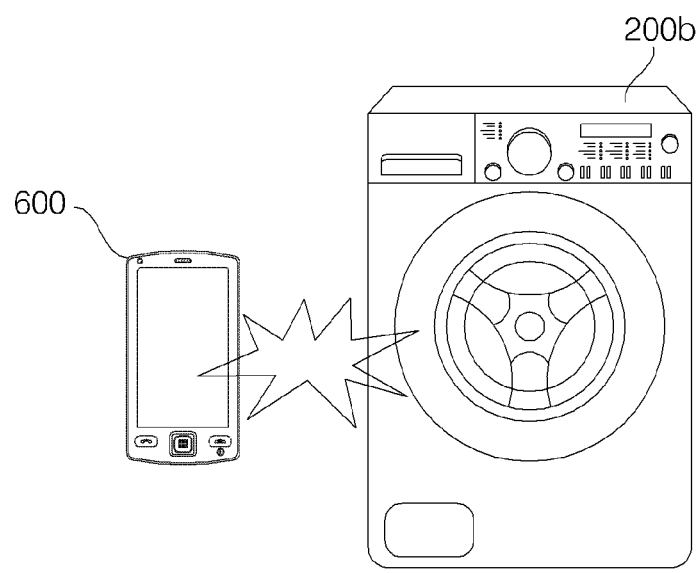
FIG. 2B is a diagram illustrating various examples of near field communication (NFC) between a mobile terminal and a home appliance.
Figure 2C:
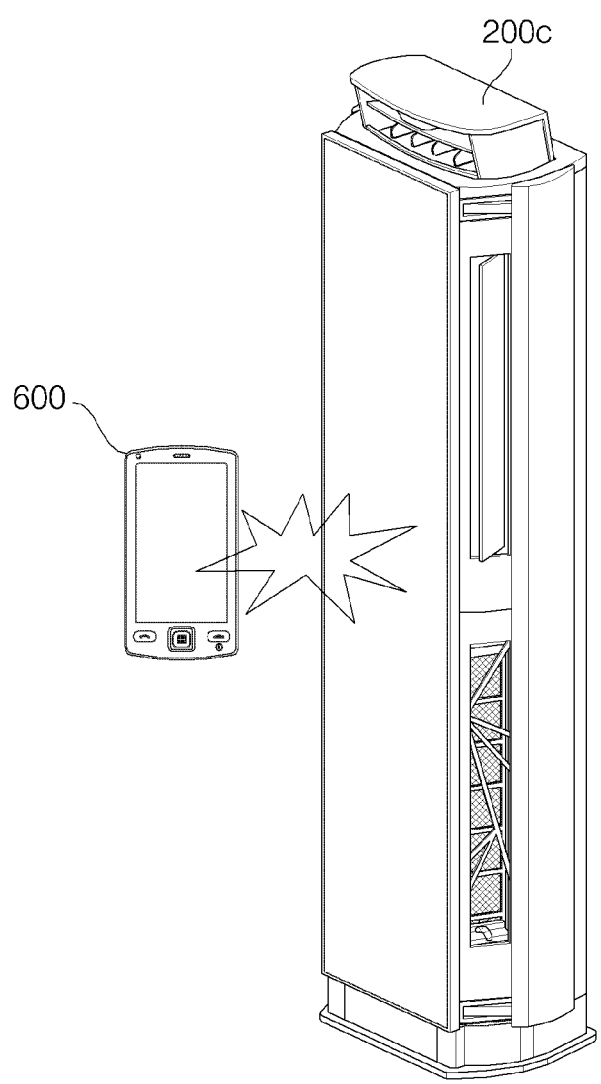
FIG. 2C is a diagram illustrating various examples of near field communication (NFC) between a mobile terminal and a home appliance.
Figure 2D:
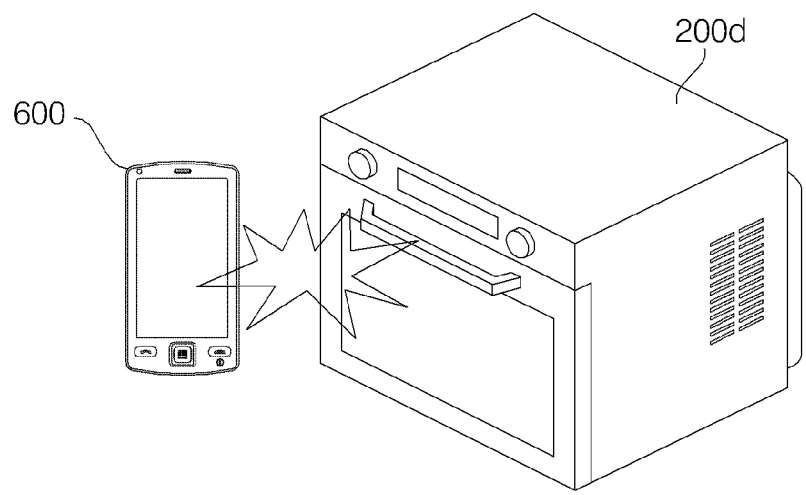
FIG. 2D is a diagram illustrating various examples of near field communication (NFC) between a mobile terminal and a home appliance.
Figure 2E:
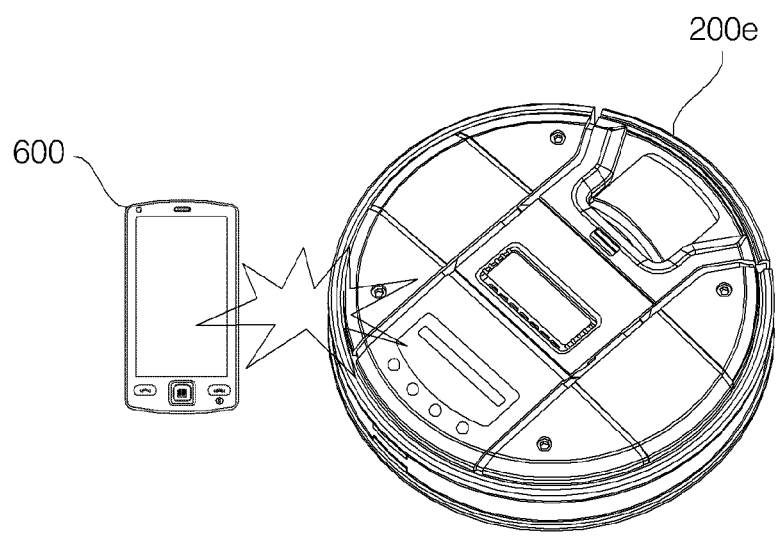
FIG. 2E is a diagram illustrating various examples of near field communication (NFC) between a mobile terminal and a home appliance.

FIG. 2a shows NFC performed between the mobile terminal 600 and the refrigerator 200a, FIG. 2b shows NFC performed between the mobile terminal 600 and the washing machine 200b, FIG. 2c shows NFC performed between the mobile terminal 600 and the air conditioner 200c, FIG. 2d shows NFC performed between the mobile terminal 600 and the cooker 200d, and FIG. 2e shows NFC performed between the mobile terminal 600 and the cleaner 200e.

FIG. 3 is a block diagram showing the internal configuration of an example of a home appliance of FIG. 1.

Referring to FIG. 3, the home appliance 200 may include an input unit 220 for user input, a display 230 for displaying an operation state of the home appliance, a communication unit 222 for communication with another external device, a driving unit 245 for driving the home appliance and a controller 270 for internal control.

For example, if the home appliance is a refrigerator, the driving unit 245 may include a refrigerating compartment driving unit for driving a refrigerating compartment fan for supplying cooling air to a refrigerating compartment, a freezer compartment driving unit for driving a freezer compartment fan for supplying cooling air to a freezer compartment, and a compressor driving unit for driving a compressor for compressing refrigerant.

As another example, if the home appliance is a washing machine, the driving unit 245 may include a driving unit for driving a drum or a tub.

As another example, if the home appliance is an air conditioner, the driving unit 245 may include a compressor driving unit for driving a compressor in an outdoor unit, a fan driving unit of the outdoor unit for driving an outdoor fan for heat exchange, and a fan driving unit of an indoor unit for driving an indoor fan for heat exchange.

As another example, if the home appliance is a cooker, the driving unit 245 may include a microwave driving unit for outputting microwaves into a cavity.

As another example, if the home appliance is a cleaner, the driving unit 245 may include a fan motor driving unit for air suction.

The communication unit 222 may include at least an NFC module 217 capable of performing NFC.

Although not shown, the home appliance 200 may further include a memory (not shown) for storing data of the home appliance.

Figure 4:
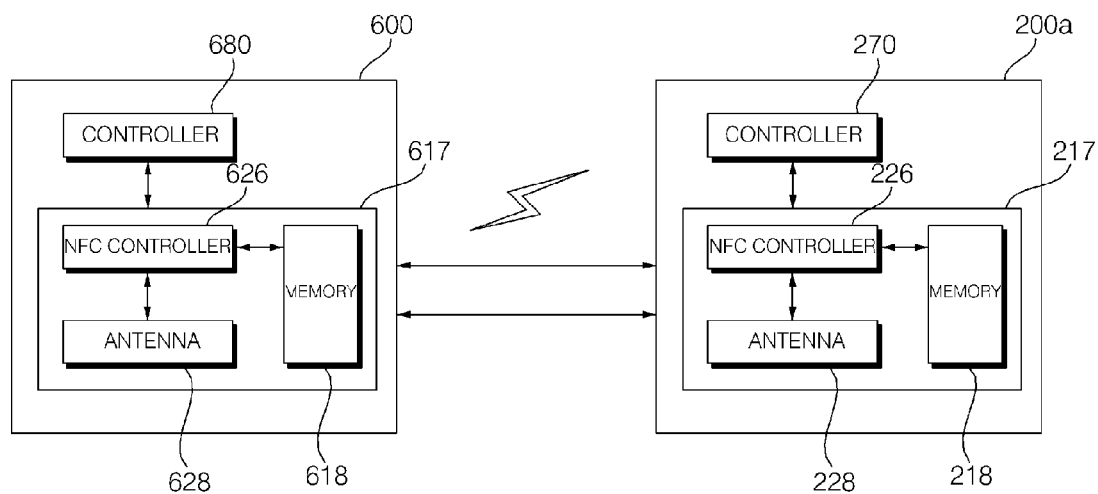
FIG. 4 is a view referred to for describing NFC of FIG. 1.

FIG. 4 is a view referred to for describing NFC of FIG. 1.

Referring to FIG. 4, the mobile terminal 600 and the home appliance 200 may transmit or receive data using an NFC method.

For data transmission or reception, the mobile terminal 600 may include an NFC module 217 including an NFC memory 617, an NFC controller 626 and an antenna 628.

The home appliance 200 may include an NFC module 225 including an NFC memory 218, an NFC controller 226 and an antenna 228.

For example, if a user places the mobile terminal 600 close to the home appliance 200 within a predetermined distance, that is, if tagging is performed, a magnetic field is provided. By change in magnetic field, the mobile terminal 600 may receive related information, e.g., product information from the home appliance 200.

Such information exchange between the mobile terminal 600 and the home appliance 200 may be performed in a read/write mode or peer-to-peer mode among a card emulation (CE) mode, read/write mode and peer-to-peer mode of NFC.

Although an active NFC module including the NFC controller and the antenna is shown in the figure, a passive NFC module including a tag NFC memory and an antenna may be used. Hereinafter, the active NFC module will be focused upon.

The controller 270 of the home appliance 200 or the NFC controller 226 of the NFC module 217 controls storage of the information related to the home appliance, e.g., the product information, in the NFC memory 218 of the NFC module 217 in a power-on state.

The NFC memory 218 of the NFC module 217 may store the information related to the home appliance, e.g., the product information in a power-on state.

If the mobile terminal 600 is tagged to the home appliance 200, the antenna 628 of the NFC module 617 of the mobile terminal 600 receives the product information from the antenna 228 of the NFC module 217 of the home appliance 200. That is, the antenna 228 of the NFC module 217 of the home appliance 200 may transmit the product information to the antenna 628 of the NFC module 617 of the mobile terminal 600.

Upon tagging, the antenna 228 of the NFC module 217 of the home appliance 200 may transmit the product information to the antenna 628 of the NFC module 617 of the mobile terminal 600 not only when the home appliance is powered on but also when the home appliance is powered off. According to the NFC method, since the mobile terminal 600 provides a magnetic field even in a power-on state, the antenna 228 of the NFC module 217 of the home appliance 200 may transmit the product information according to change in magnetic field.

The controller 670 of the mobile terminal 600 may control transmission of the received product information to the server 500.

If the mobile terminal 600 is tagged to the home appliance 200 again, the antenna 628 of the NFC module 617 of the mobile terminal 600 may receive the product information from the antenna 228 of the NFC module 217 of the home appliance 200 again. If the received product information matches the previously received and stored product information, the controller 226 of the NFC module 617 of the mobile terminal 600 may control reading of the state information from the NFC module 217 of the home appliance 200. More specifically, the controller 226 of the NFC module 617 of the mobile terminal 600 may control reading of the state information stored in the NFC memory 218 of the NFC module 217 of the home appliance 200.

The controller 670 of the mobile terminal 600 may control transmission of the received state information to the server 500.

Figure 5:
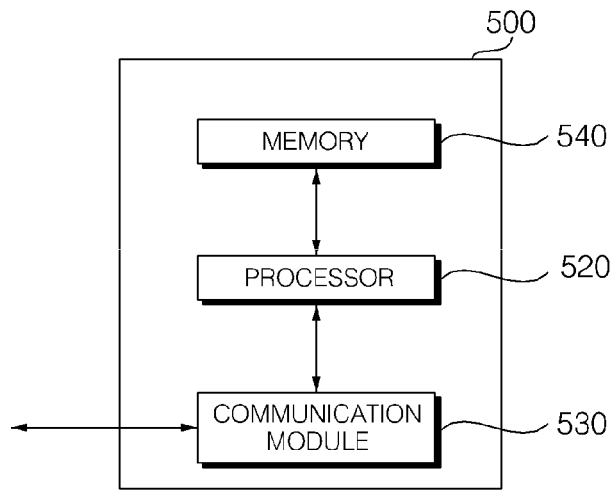
FIG. 5 is a block diagram showing the internal configuration of a server of FIG. 1.

FIG. 5 is a block diagram showing the internal configuration of a server of FIG. 1.

Referring to FIG. 5, the server 500 may include a communication module 530, a memory 540 and a processor 520.

The communication module 530 may receive home appliance related information from the mobile terminal 600. In particular, home appliance product information may be received. The communication module 530 may transmit product information registration result information corresponding to the received home appliance related information to the mobile terminal 600.

The communication module 530 may include an Internet module or a mobile communication module.

The memory 540 may store the received home appliance related information and include data for generating result information corresponding to the home appliance related information.

For example, if the home appliance related information is product information of the home appliance, the memory 540 may store the received product information, for product registration of the home application.

As another example, if the home appliance related information is failure information of the home appliance, the memory 540 may store data for failure diagnosis of the home appliance.

As another example, if the home appliance related information is power consumption information of the home appliance, the memory 540 may store power price information, on peak time power information, off peak time power information, real-time power information, etc.

The processor 520 may perform overall control of the server 500.

If the home appliance related information is received from the mobile terminal 600, the processor 520 may control generation of result information corresponding to the home appliance related information. The generated result information may be controlled for transmission to the mobile terminal 600.

For example, if the home appliance related information is product information of the home appliance, the processor 520 may generate product registration result information of the home appliance.

As another example, if the home appliance related information is failure information of the home appliance, the processor 520 may generate failure diagnosis result information of the home appliance using failure diagnosis data stored in the memory 540.

As another example, if the home appliance related information is power consumption information of the home appliance, the processor 520 may control transmission of power information, such as power price information, on peak time power information, off peak time power information, real-time power information, etc. stored in the memory 540, to the mobile terminal 600.

The server 500 may be managed by a manufacturer of the home appliance 200 or an operator of an application store related to the home appliance 200.

Figure 6:
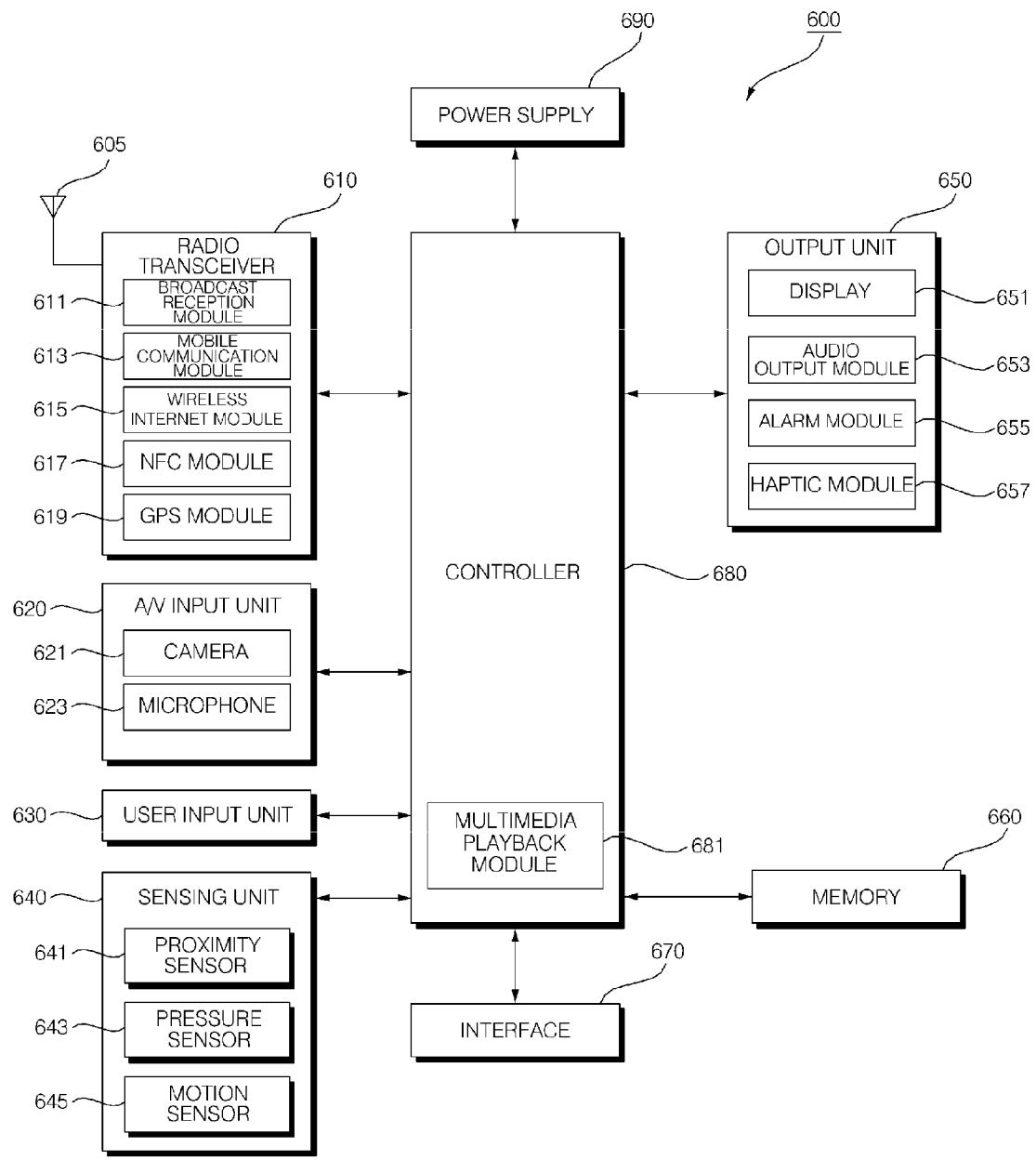
FIG. 6 is a block diagram showing the internal configuration of a mobile terminal of FIG. 1.

FIG. 6 is a block diagram showing the internal configuration of a mobile terminal of FIG. 1.

Referring to FIG. 6, the mobile terminal 600 may include a radio transceiver 610, an audio/video (A/V) input unit 620, a user input unit 630, a sensing unit 640, an output unit 650, a memory 660, an interface 670, a controller 680 and a power supply 690.

The radio transceiver 610 may include a broadcast reception module 611, a mobile communication module 613, a wireless Internet module 615, a near field communication (NFC) module 617, a global positioning system (GPS) module 619, etc.

The broadcast reception module 611 may receive at least one of a broadcast signal and broadcast-related information from an external broadcast management server through a broadcast channel. The broadcast channel may include a satellite channel and a terrestrial channel.

The broadcast signal and/or the broadcast-related information received through the broadcast reception module 611 may be stored in the memory 660.

The mobile communication module 613 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 615 is an internal or external module for wireless Internet access which may be provided to the mobile terminal 600. For example, the wireless Internet module 615 may perform Wi-Fi based wireless communication or Wi-Fi Direct based wireless communication.

The NFC module 617 may perform NFC. The NFC module 617 may receive data from the home appliance or transmit data to the home appliance, if approaching the home appliance having an NFC tag or an NFC module within a predetermined distance, that is, upon tagging.

As short-range wireless communication technology, Bluetooth, Radio-Frequency IDentification (RFID), Infrared Data Association (IrDA), Ultra WideBand (UWB), and ZigBee may be used.

The GPS module 619 may receive position information from a plurality of GPS satellites.

The A/V input unit 620 receives an audio signal or a video signal and may include a camera 621 and a microphone 623.

The user input unit 630 generates key input data enabling the user to control the operation of the mobile terminal. The user input unit 630 may include a keypad, a dome switch, a touchpad (static pressure/static electrical), etc. In particular, if the touchpad and the display 651 have a layered structure, this may be called a touchscreen.

The sensing unit 640 detects a current state of the mobile terminal 600 such as whether the mobile terminal 600 is opened or closed, the position of the mobile terminal 600 and contact/non-contact of a user and generates a sensing signal for controlling the operation of the mobile terminal 600.

The sensing unit 640 may include a proximity sensor 641, a pressure sensor 643 and a motion sensor 645. The motion sensor 645 may sense motion or position of the mobile terminal 600 using an acceleration sensor, a gyroscopic sensor and a gravity sensor. In particular, the gyroscopic sensor measures an angular speed and senses a direction (angle) in which the mobile terminal rotates from a reference direction.

The output unit 650 may include a display 651, an audio output module 653, an alarm unit 655 and a haptic module 657.

The display 651 displays information processed by the mobile terminal 600.

As described above, if the display 651 and the touchpad have the layered structure to configure the touchscreen, the display 651 can be used not only as an output device but also as an input device for inputting information via user touch.

The audio output module 653 may output audio data received from the radio transceiver 610 or stored in the memory 660. The audio output module 653 may include a speaker, a buzzer, etc.

The alarm unit 655 outputs a signal notifying the user that an event has occurred in the mobile terminal 600. For example, the alarm unit 655 may output a signal in the form of vibrations.

The haptic module 657 generates a variety of tactile effects that the user can feel. A typical example of the tactile effect generated by the haptic module 657 is vibration.

The memory 660 may store a program for processing and control of the controller 680 and may temporarily store input or output data (for example, a phonebook, messages, audio, still images, and moving images).

The interface 670 serves as an interface with all external devices connected to the mobile terminal 600. The interface 670 may receive data from an external device or receive power and transmit power to the components of the mobile terminal 600 or transmit data of the mobile terminal 600 to an external device.

The controller 680 controls the overall operation of the mobile terminal 600. For example, the controller 680 performs control and processing associated with voice communication, data communication, video communication, and the like. The controller 680 may include a multimedia playback module 681 for multimedia playback. The multimedia playback module 681 may be implemented in the controller 680 in hardware form or may be implemented in software form separately from the controller 680.

The power supply 690 receives external power or internal power and supplies power required for operation to each component under control of the controller 680.

The block diagram of the mobile terminal 600 shown in FIG. 6 is only exemplary. Depending upon the specifications of the mobile terminal 600 in actual implementation, the components of the mobile terminal 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Figure 7:
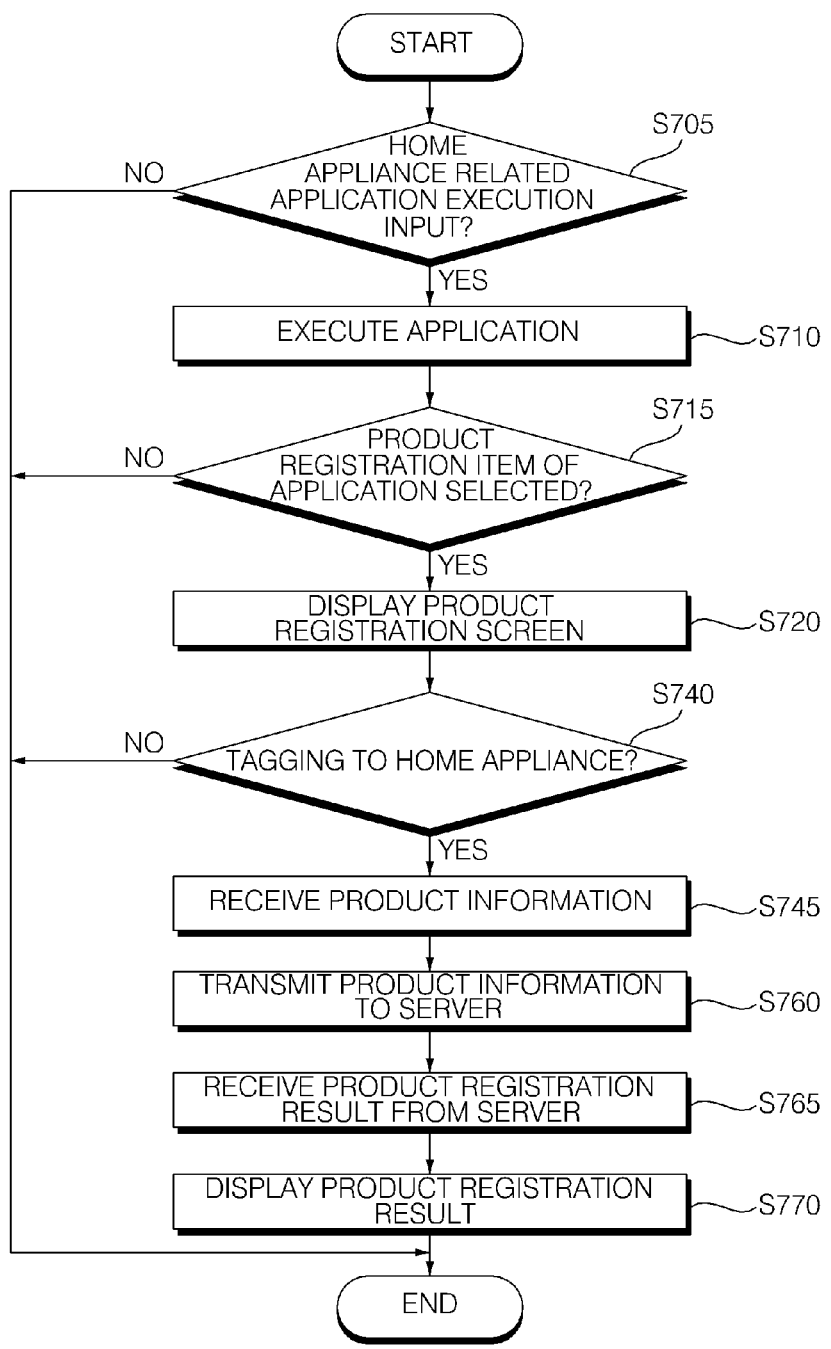
FIG. 7 is a flowchart illustrating a method for operating a mobile terminal according to an embodiment of the present invention.
Figure 8:
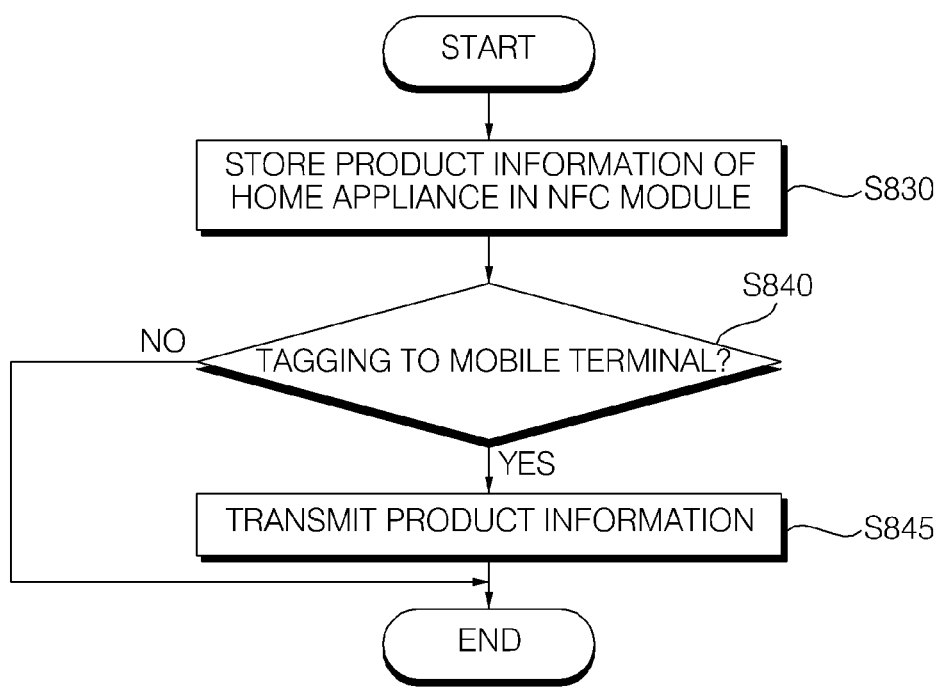
FIG. 8 is a flowchart illustrating a method for operating a home appliance according to an embodiment of the present invention.

FIG. 7 is a flowchart illustrating a method for operating a mobile terminal according to an embodiment of the present invention, FIG. 8 is a flowchart illustrating a method for operating a home appliance according to an embodiment of the present invention, and FIGS. 9 to 13*b* are views referred to for describing the operating method of FIG. 7 or 8.

First, referring to FIG. 7, the mobile terminal 600 determines whether application execution input related to the home appliance is received (S705). If so, the application is executed (S710). Step S905 of FIG. 9 corresponds to step S705 of FIG. 7 and step S910 of FIG. 9 corresponds to step S710 of FIG. 7.

Figure 10A:
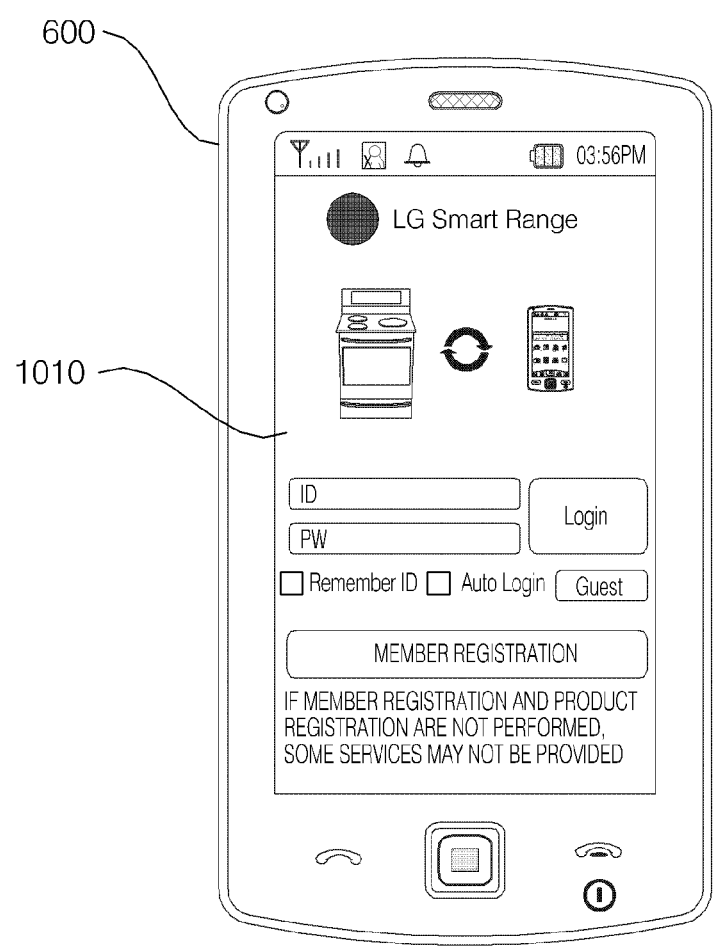
FIG. 10A is an exemplary screen associated with home appliance application.

FIG. 10*a* shows display of a home appliance related application execution screen 1010 on the mobile terminal 600.

If the mobile terminal 600 receives the home appliance related application execution input according to user input, the controller 680 of the mobile terminal 600 controls execution of the pre-installed home appliance related application.

If the home appliance related application is not installed, the mobile terminal 600 may access the server 500, download the home appliance related application and install the home appliance related application in the mobile terminal 600.

In particular, the application execution screen 1010 of FIG. 10*a* may include a user login item (an ID and a password) and a member registration item.

In the mobile terminal 600, if login is performed after the home appliance related application is executed, a variety of operation control related to the home appliance may be performed via the application.

Next, if the product registration item of the executed application is selected according to user input, the mobile terminal 600 selects the item (S715) and displays a product registration screen (S720). Step 915 of FIG. 9 corresponds to step S715 of FIG. 7 and step S920 of FIG. 9 corresponds to step S720 of FIG. 7.

Figure 10B:
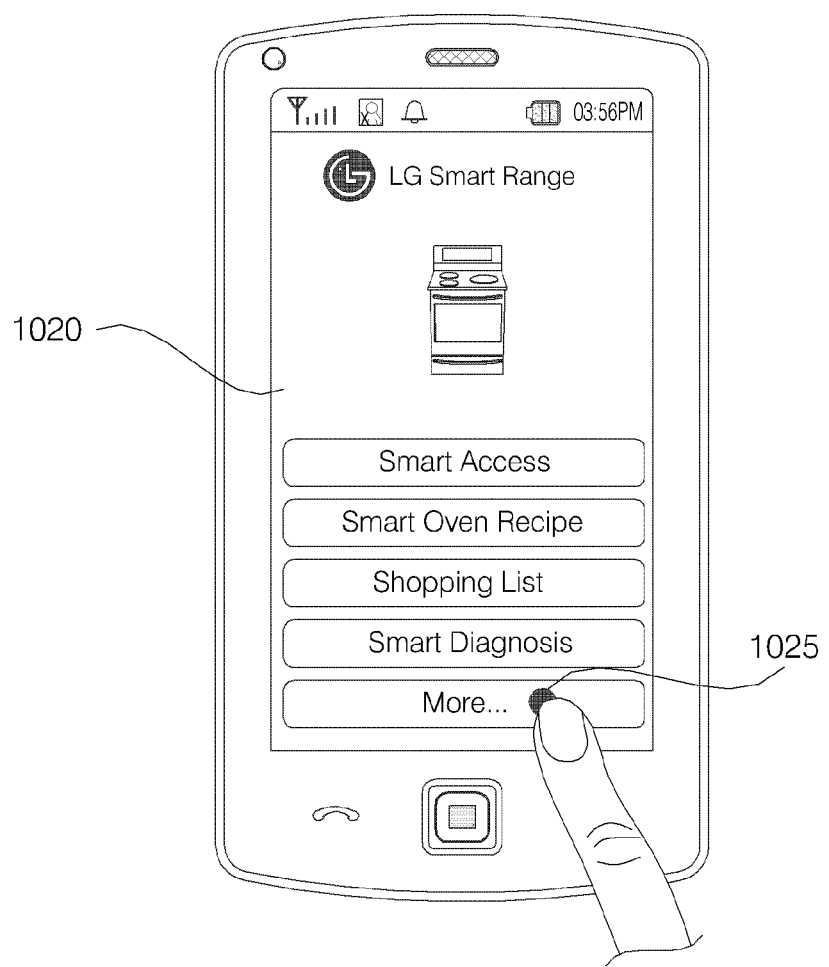
FIG. 10B is another exemplary screen associated with home appliance application.
Figure 10C:
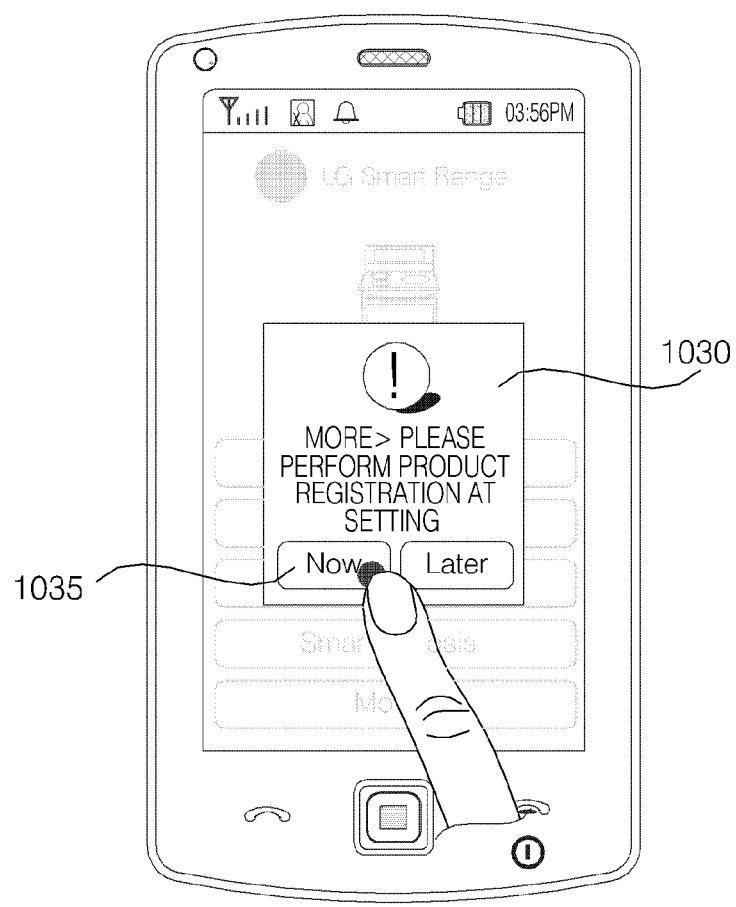
FIG. 10C is still another exemplary screen associated with home appliance application.

Next, FIG. 10*b* shows selection of a more item 1025 from the home appliance related application screen 1020. Then, as shown in FIG. 10*c*, a product registration screen 1030 may be displayed. FIG. 10*c* shows selection of a product registration item 1035 on the product registration screen 1030. Then, as shown in FIG. 10d, the product registration screen 1040 may be displayed on the mobile terminal 600.

The home appliance related application screen 1020 of FIG. 10b may provide various functions to the user. The application screen 1020 of FIG. 10b may include a smart access item capable of performing remote control and monitoring, a smart recipe item capable of providing recipe related information, a shopping list item capable of a shopping list in association with a refrigerator or a cooker, a smart diagnosis item capable of providing a service related to failure diagnosis of the home appliance and a more item for viewing additional items.

Figure 10D:
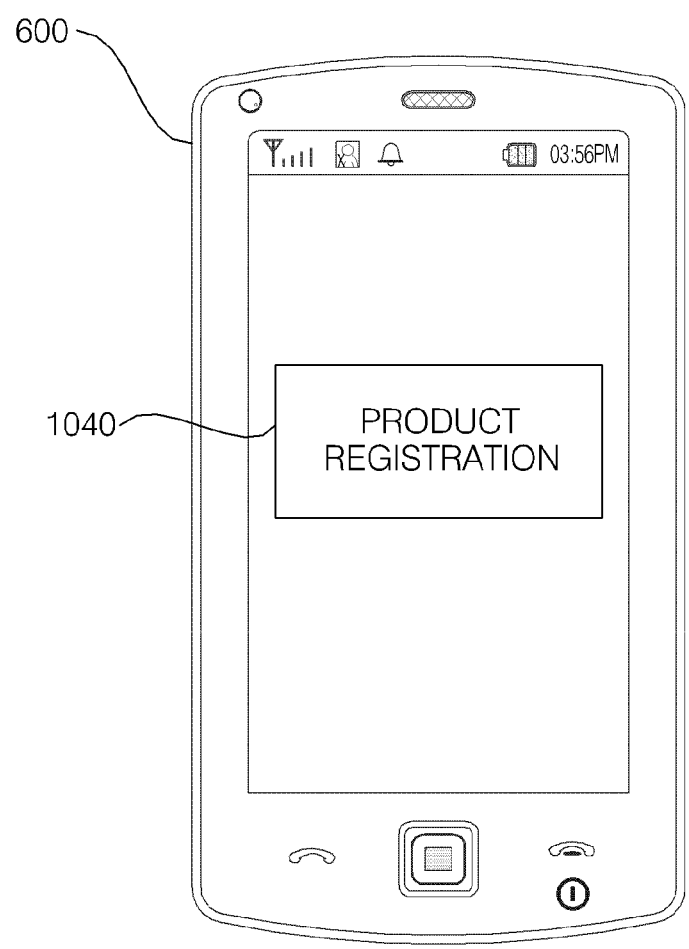
FIG. 10D is still another exemplary screen associated with home appliance application.

Although not shown, the product registration screen 1040 of FIG. 10d may include an "NFC product registration" item (not shown) indicating a diagnosis method using NFC. After the "NFC product registration" item (not shown) is selected, step S740 and subsequent steps thereof may be performed.

In association with FIG. 8, the home appliance 600 stores product information of the home appliance in the NFC module 217 (S830). Step S930 of FIG. 9 corresponds to step S830 of FIG. 8.

If the home appliance 200 is powered on, the controller 270 of the home appliance may control storage of the product information of the home appliance in the NFC module 217.

For example, if the washing machine 200b is powered on, and, more particularly, if the washing machine 200b is first powered on, the NFC module of the washing machine 200b may store the product information of the washing machine, which is stored in the memory of the washing machine 200b, in the NFC module 217 of the washing machine 200b. More specifically, the product information of the washing machine may be stored in the memory 218 of the NFC module 217.

The product information of the washing machine may include product type information indicating that a product type is a washing machine, product manufacture date information, a product serial number, type/version information of firmware installed in the product, etc.

Referring to FIG. 7 again, the mobile terminal 600 determines whether the mobile terminal is tagged to the home appliance (S740). If tagging is performed, product information which is information related to product registration is received from the home appliance based on tagging (S745). Step S940 of FIG. 9 corresponds to step S740 of FIG. 7 and step S840 of FIG. 8 and step S945 of FIG. 9 corresponds to step S745 of FIG. 7 and step S845 of FIG. 8.

Figure 10E:
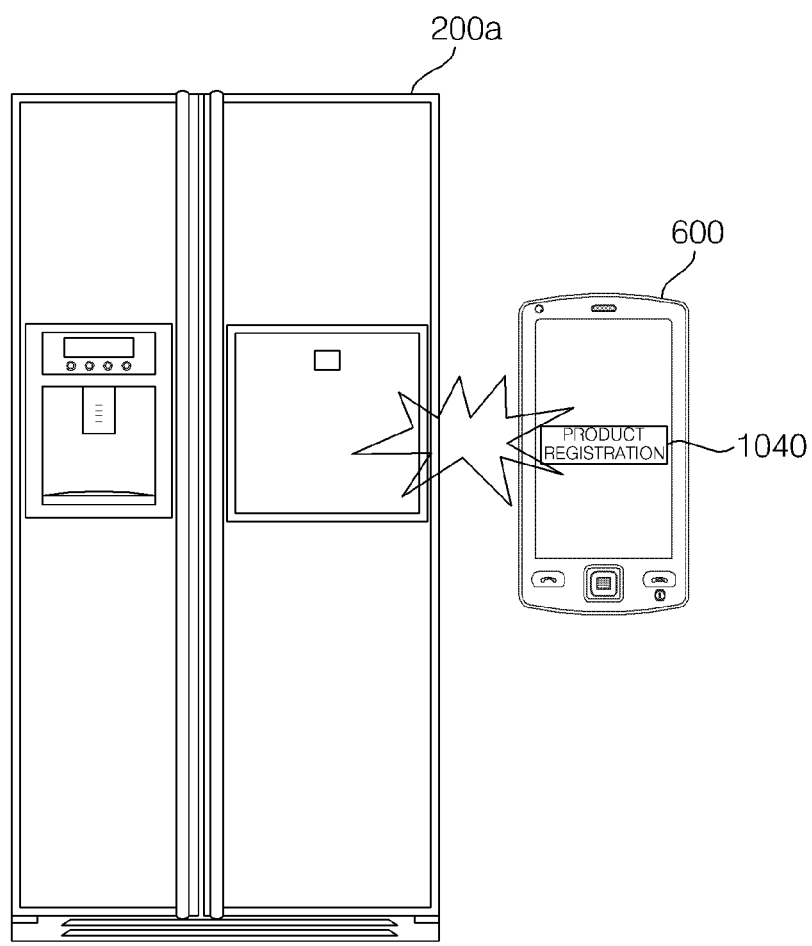
FIG. 10E is still another exemplary screen associated with home appliance application.

FIG. 10e shows the case in which the mobile terminal 600 approaches the refrigerator 200a in a state in which the mobile terminal 600 displays the product registration screen 1040, that is, the case in which tagging is performed.

If the mobile terminal 600 approaches the refrigerator 200a within a predetermined distance capable of performing NFC, the NFC module 617 of the mobile terminal 600 may provide a magnetic field to the refrigerator 200a. Conversely, the NFC module 217 of the refrigerator 200a may provide a magnetic field to the mobile terminal 600.

The mobile terminal 600 reads or receives the product information from the memory 218 of the NFC module 217 of the refrigerator 200a using the magnetic field.

If the mobile terminal is tagged to the home appliance in a state in which the product registration screen is displayed, it is possible to conveniently receive product information and to easily perform product registration.

The received home appliance product information may be stored in the memory 618 of the NFC module 617 of the mobile terminal 600. The NFC controller 626 of the NFC module 617 of the mobile terminal 600 may notify the controller 680 of the mobile terminal 600 that the home appliance product information has been stored in the memory 618. For example, a reception flag may be changed from "0" to "1" to notify the controller 680 of the mobile terminal 600 that the home appliance product information has been received.

If the mobile terminal 600 receives the product information of the home appliance, the controller 680 of the mobile terminal 600 may control display of an object indicating whether product registration is performed according to product information reception.

Figure 10F:
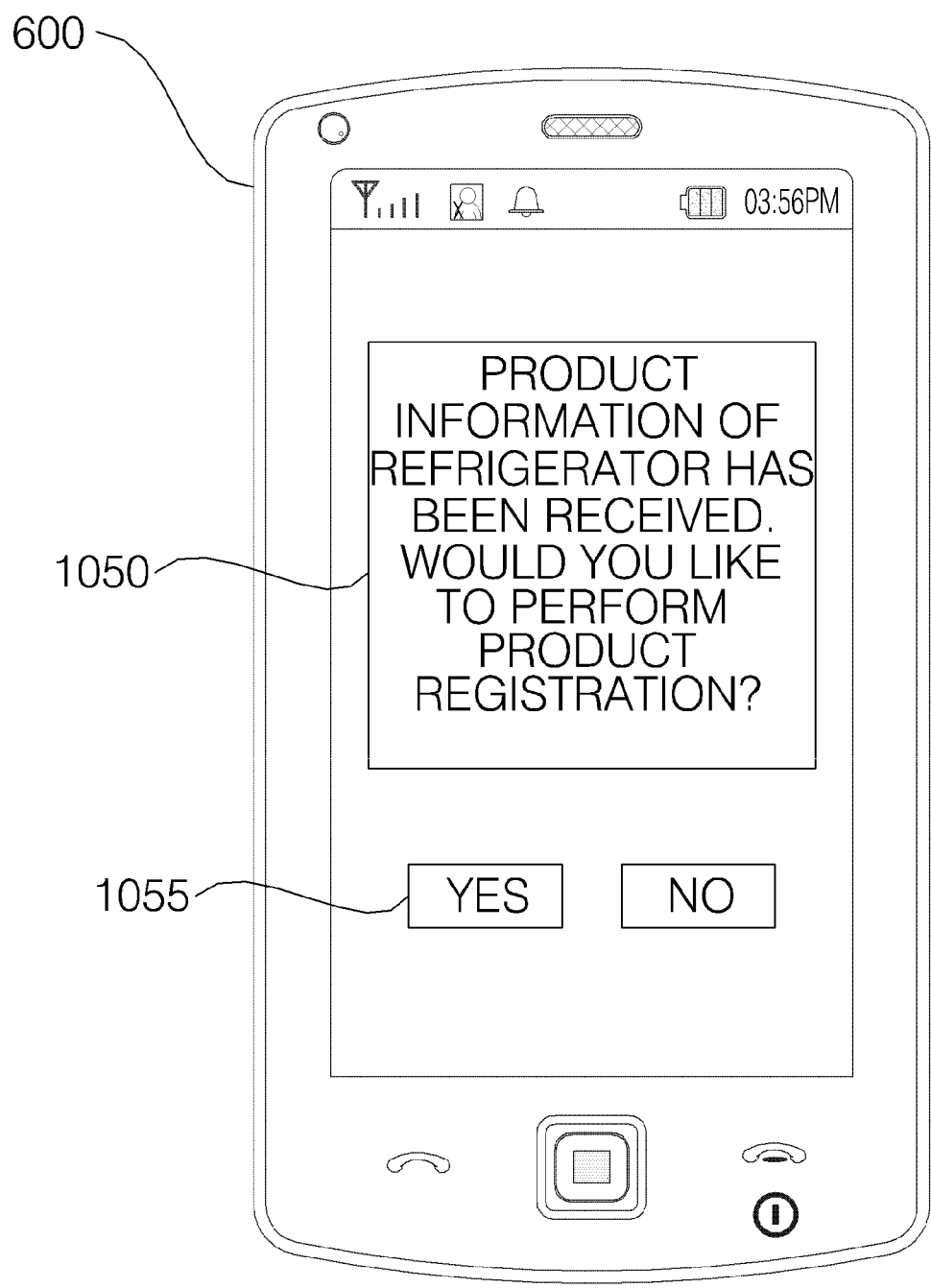
FIG. 10F is still another exemplary screen associated with home appliance application.
Figure 10G:
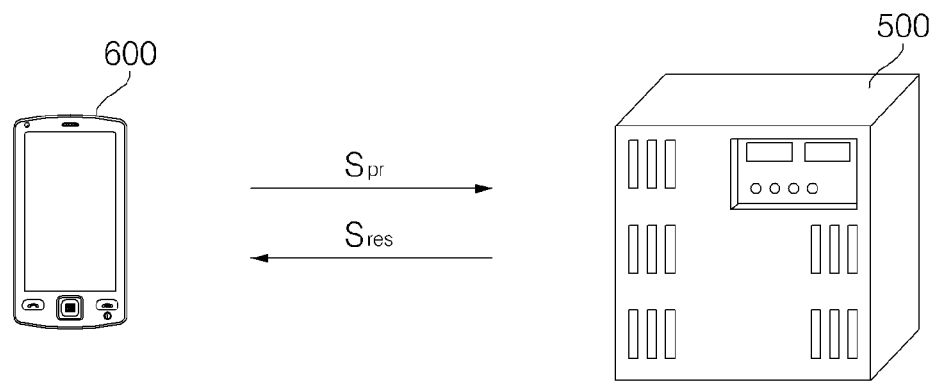
FIG. 10G is still another exemplary screen associated with home appliance application.

FIG. 10f shows display of a screen 1050 for displaying the product information received by the mobile terminal 600 and asking whether product registration is performed according to the product information. At this time, if the user selects the product registration item 1055, the controller 680 of the mobile terminal 600 may control transmission of the product information to the server 500.

Next, the mobile terminal 600 transmits the received product information to the server (S760). Then, the mobile terminal 600 receives, from the server, product registration result information corresponding to the received product information (S765). Then, the product registration result information is displayed on the display (S770). Step S960 of FIG. 9 corresponds to step S760 of FIG. 7, step S965 of FIG. 9 corresponds to step S765 of FIG. 7 and step S970 of FIG. 9 corresponds to step S770 of FIG. 7.

FIG. 10 g shows the case in which the mobile terminal 600 transmits the product information Spr received from the home appliance 200 to the server 500 and the server 500 transmits the product registration result information Sres to the mobile terminal 600.

As the product information Spr of the mobile terminal 600 is transmitted, the communication module 530 of the server 500 receives the home appliance product information Spr from the mobile terminal 600.

The processor 520 of the server 500 may control storage of the home appliance product information in the memory 540 and control product registration based on the product information Spr.

Upon product registration, product type information, product manufacture date information, a product serial number, type/version information of firmware installed in the product, etc. may be used.

If user information (user name, id, password, address, age, family relationship, etc.) is necessary upon product registration, the processor 520 of the server 500 may request, from the mobile terminal 600, transmission of additional information necessary for product registration, e.g., user information.

In this case, the mobile terminal 600 may display, on a screen, a message indicating that a user information transmission request is received from the server 600. If the user accepts user information transmission, the controller 680 of the mobile terminal 600 may control transmission of the user information pre-stored in the mobile terminal 600 to the server 600.

Alternatively, if the user information is not stored in the mobile terminal 600, the controller 680 of the mobile terminal 600 may control display of a screen for user information input.

The server 500 may complete product registration using the received product information and the additional information.

The processor 520 of the server 500 may control generation of product registration result information of the home appliance and transmission of the product registration result information to the mobile terminal 600. Then, the communication module 530 of the server 500 may transmit the product registration result information to the mobile terminal 600.

The radio transceiver 610 of the mobile terminal 600, e.g., the mobile communication module 613 or the wireless internet module 615, may receive the product registration result information from the communication module 530 of the server 500 and send the received product registration result information to the controller 680.

The controller 680 of the mobile terminal 600 may control generation and display of a product registration result screen using the received product registration result information.

Figure 10H:
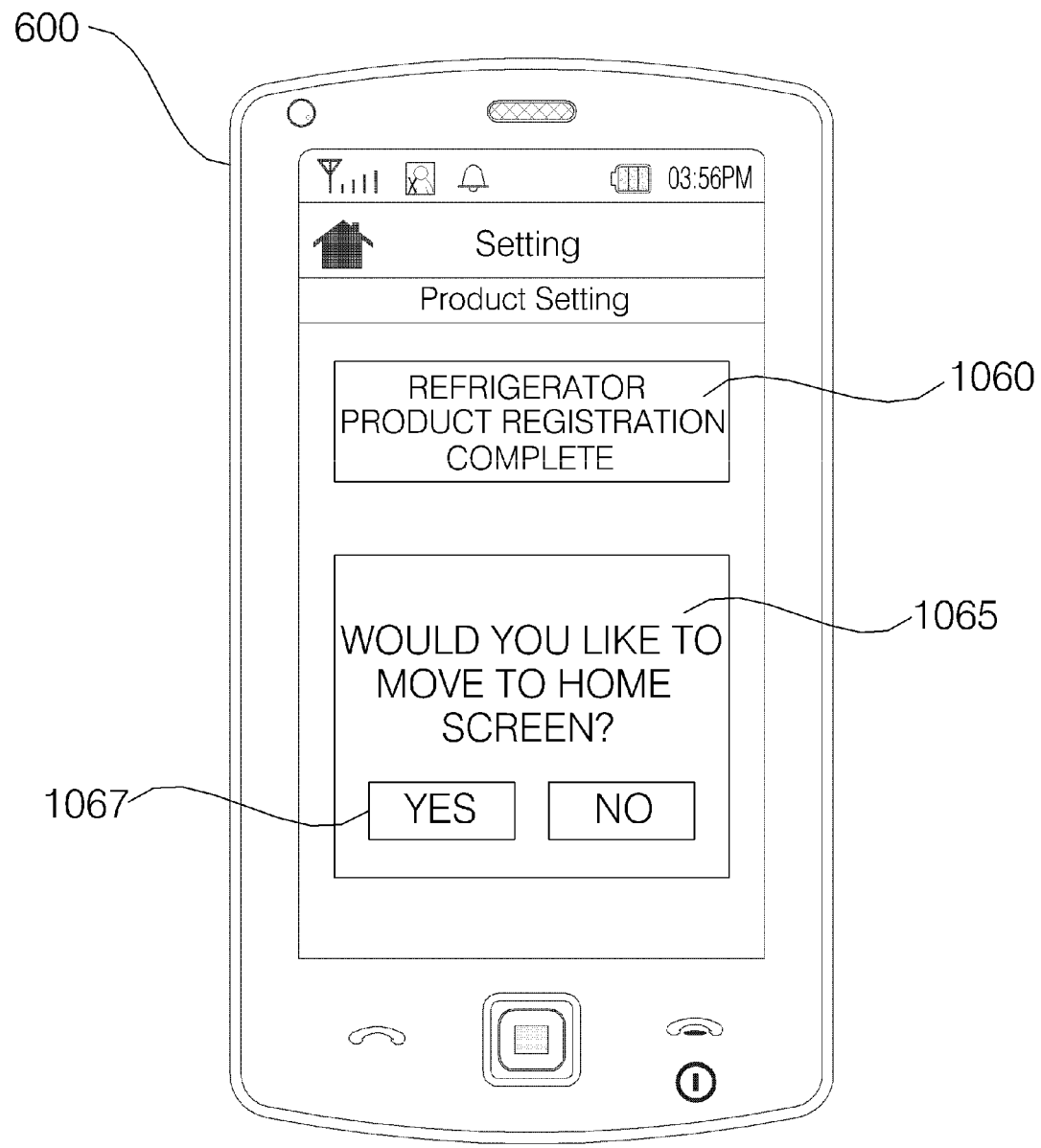
FIG. 10H is still another exemplary screen associated with home appliance application.

FIG. 10h shows display of the received product registration completion result screen 1060 on the mobile terminal 600. The mobile terminal receives the product registration result information from the server and displays the product registration result information such that the user may conveniently recognize that product registration has been completed.

Figure 10I:
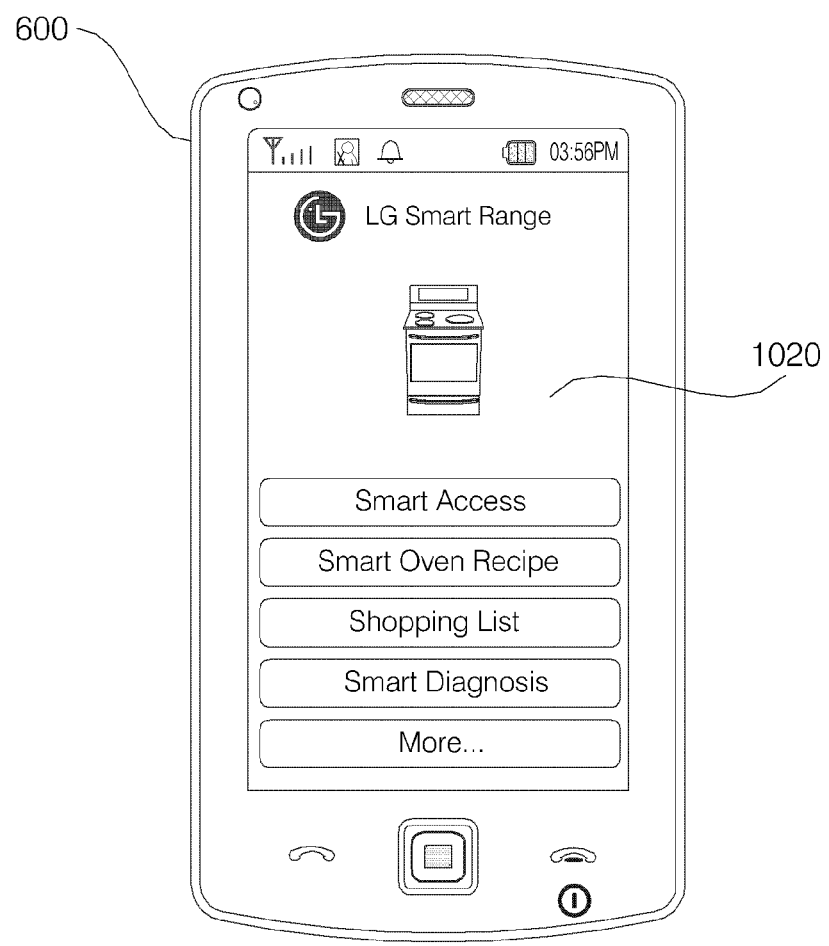
FIG. 10I is still another exemplary screen associated with home appliance application.

The product registration completion result screen 1065 of FIG. 10h may include a home screen movement screen 1065. If a movement item 1067 is selected from the home screen movement screen 1065, as shown in FIG. 10i, an application screen 1020 including a smart access item capable of performing remote control and monitoring, the application screen 1020 including a smart recipe item capable of providing recipe related information, a shopping list item capable of a shopping list in association with a refrigerator or a cooker, a smart diagnosis item capable of providing a service related to failure diagnosis of the home appliance and a more item for viewing additional items may be displayed. Accordingly, the user may use various services.

Alternatively, if the movement item 1067 is selected from the home screen movement screen 1065 of FIG. 10h, as shown in FIG. 10a, the login screen 1010 of the home appliance related application screen may be displayed.

Wireless data communication between the mobile terminal 600 and the server 500 may be performed using an adjacent access point (AP) device.

Figure 11A:
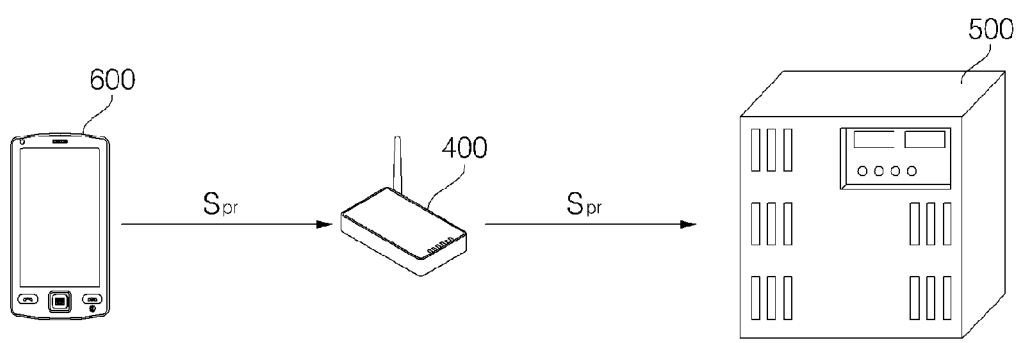
FIG. 11A illustrates mobile terminal transmitting product information.

FIG. 11a shows the state in which the mobile terminal 600 transmits product information Spr to the AP device 400 and the AP device 400 transmits the product information Spr to the server 500 over a network.

Figure 11B:
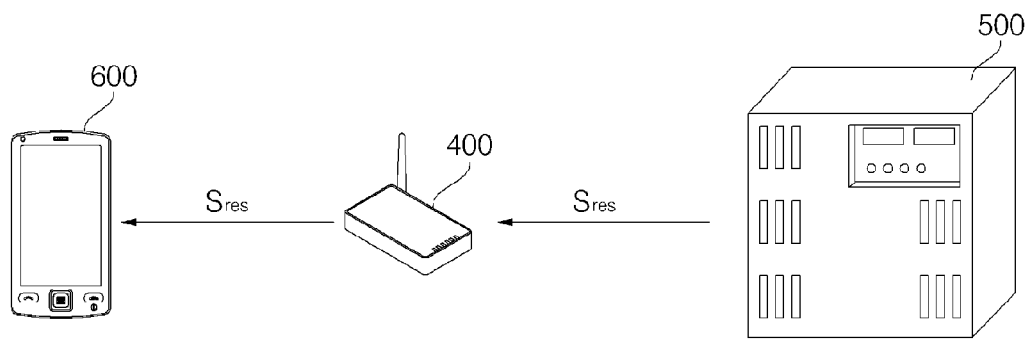
FIG. 11B illustrates the server transmitting the product information result information.

Next, FIG. 11b shows the state in which the server 500 transmits the product registration result information Sres to the AP device 400 over a network and the AP device 400 transmits the product registration result information Sres to the mobile terminal 600.

Figure 11C:
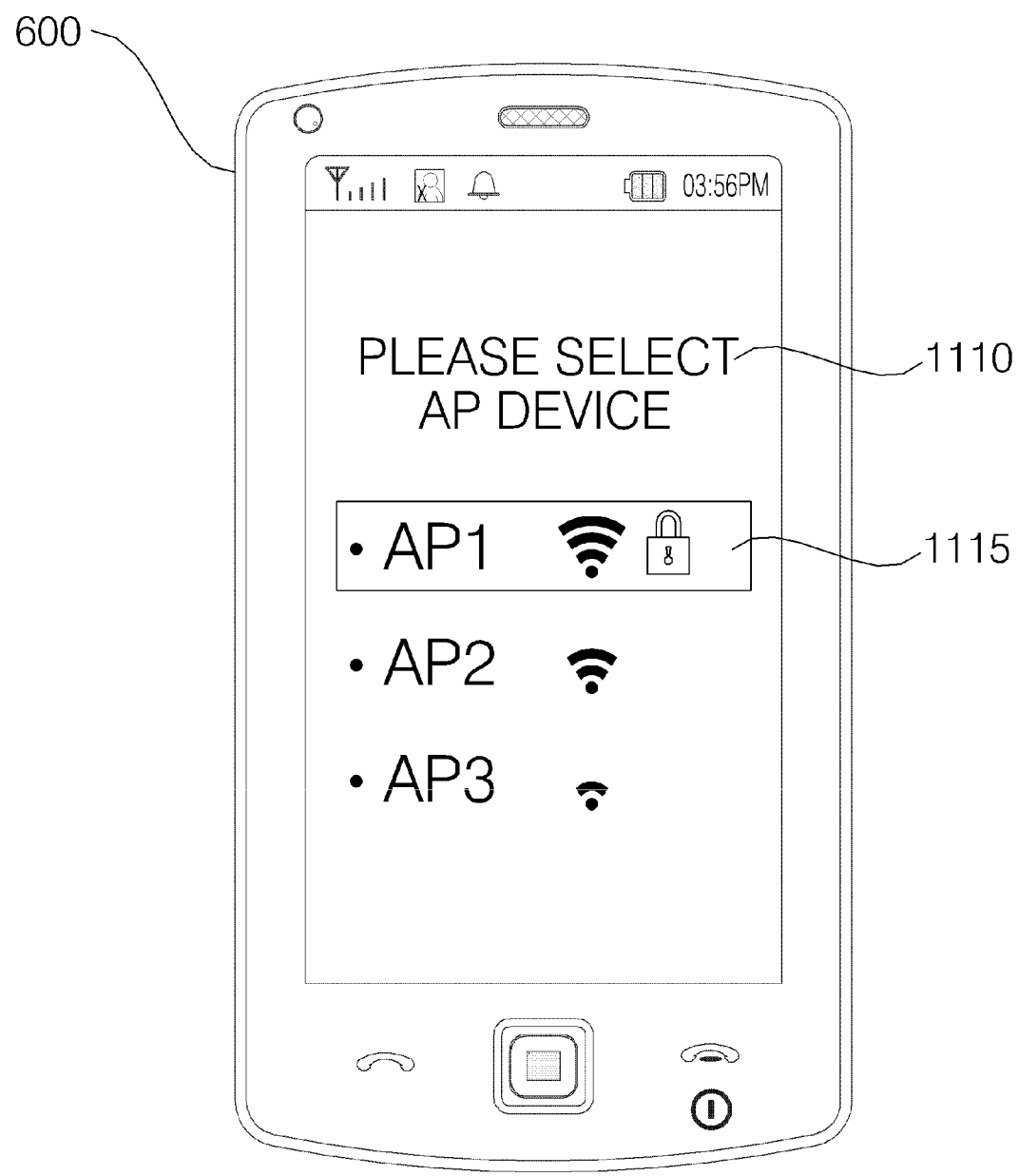
FIG. 11C illustrates the mobile terminal displaying an AP device list.

If wireless data communication between the mobile terminal 600 and the server 500 is performed using the adjacent AP device 400, the mobile terminal 600 may display an AP device list screen 1110, as shown in FIG. 11c, before transmitting the product information to the server 500. More specifically, the AP device list screen 1110 shown in FIG. 11c may be displayed between the screens of FIG. 10f and FIG. 10h.

FIG. 11c shows the AP device list screen 1110 including a plurality of AP device items AP1, AP2, AP3, . . . . The AP device list screen 1110 may include names of the plurality of AP device items, network state information, encryption information, etc.

Figure 11D:
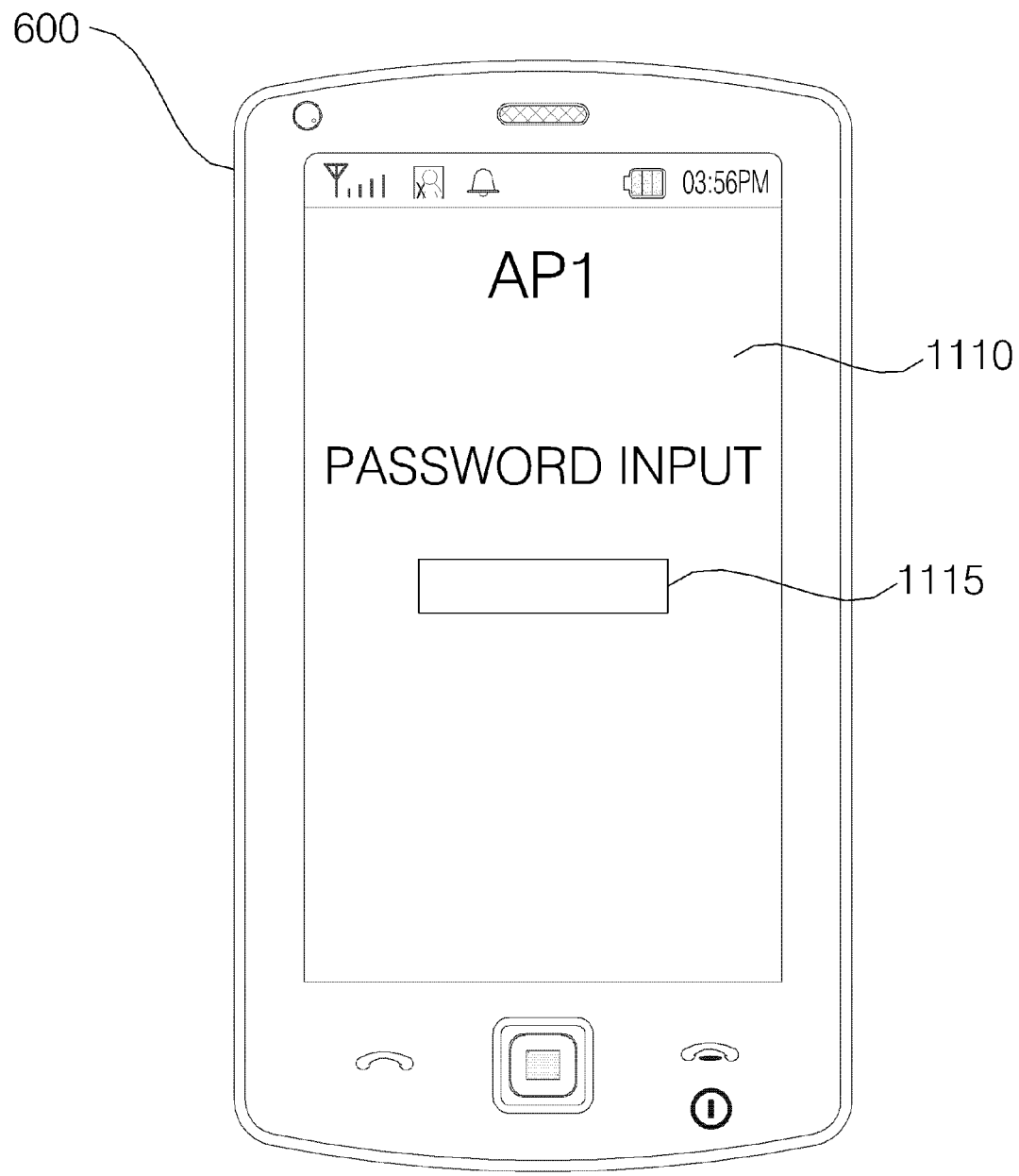
FIG. 11D illustrates a screen after selection of a given AP device.

If the first AP device item 1115 is selected by user selection, as shown in FIG. 11d, a password input item 115 may be displayed. Unlike FIG. 11d, the password input item 1115 may be displayed on the screen of FIG. 11c in a popup form.

Thus, the user can transmit the product information of the home appliance to the server 500 via a desired AP device 400.

The AP device list screen 1110 of FIG. 11c may be displayed if wireless network identifier information SSID from the AP device before product registration is performed via the mobile terminal 600. If any one AP device is selected from the AP device list by user selection, the AP device may be accessed wirelessly. That is, even upon product registration, the server 500 may be accessed using the selected AP device without displaying the AP device list screen 1110.

Figure 12:
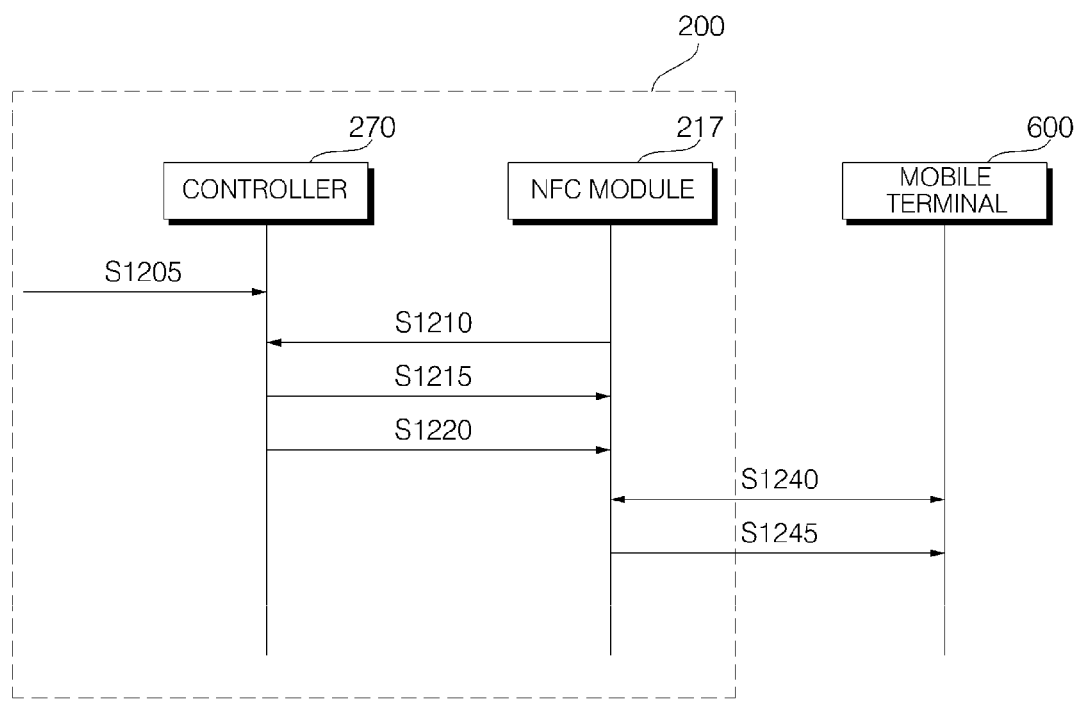
FIG. 12 is a signal flow between the controller 270 and the NFC module 217 of the home appliance.

FIG. 12 shows signal flow between the controller 270 and the NFC module 217 of the home appliance.

Referring to FIG. 12, the controller 270 receives a power-on signal if the home appliance is powered on (S1205). Then, power is supplied to the units of the home appliance in a standby mode.

Next, the controller 270 reads the identifier information stored in a system region of the memory 218 of the NFC module 217 (S1210). Then, the controller 270 determines whether the read identifier information matches the pre-stored identifier information in the memory (not shown) and, if not, writes the pre-stored identifier information in the memory 218 of the NFC module 217.

If power is turned on and, if power is first turned on, the controller 270 performs synchronization with the NFC module 217 using the pre-stored identifier information in the memory (not shown). That is, the controller may transmit the pre-stored identifier information in the memory (not shown) to the NFC module 217.

Meanwhile, the controller 270 may periodically or occasionally read a data header from the memory 218 of the NFC module 217 and write pre-stored data header information in the memory 218 of the NFC module 217 if the read data header does match the pre-stored data header in the memory (not shown).

The controller 270 determines whether product information is written in the memory 218 of the NFC module 217 (S1215) and writes the product information in the memory 218 of the NFC module 217 (S1220). This may correspond to step S830 of FIG. 8.

Next, if the mobile terminal 600 is tagged to the home appliance 600 and, more particularly, the NFC module 217 of the home appliance (S1240), the NFC module 217 of the home appliance transmits the product information written in the memory 218 to the mobile terminal 600 (S1245). Accordingly, the mobile terminal 600 can conveniently receive the product information and easily perform product registration.

FIGS. 13a to 13d show the cases in which product registration is performed based on tagging if the mobile terminal is tagged to various home appliances.

Figure 13A:
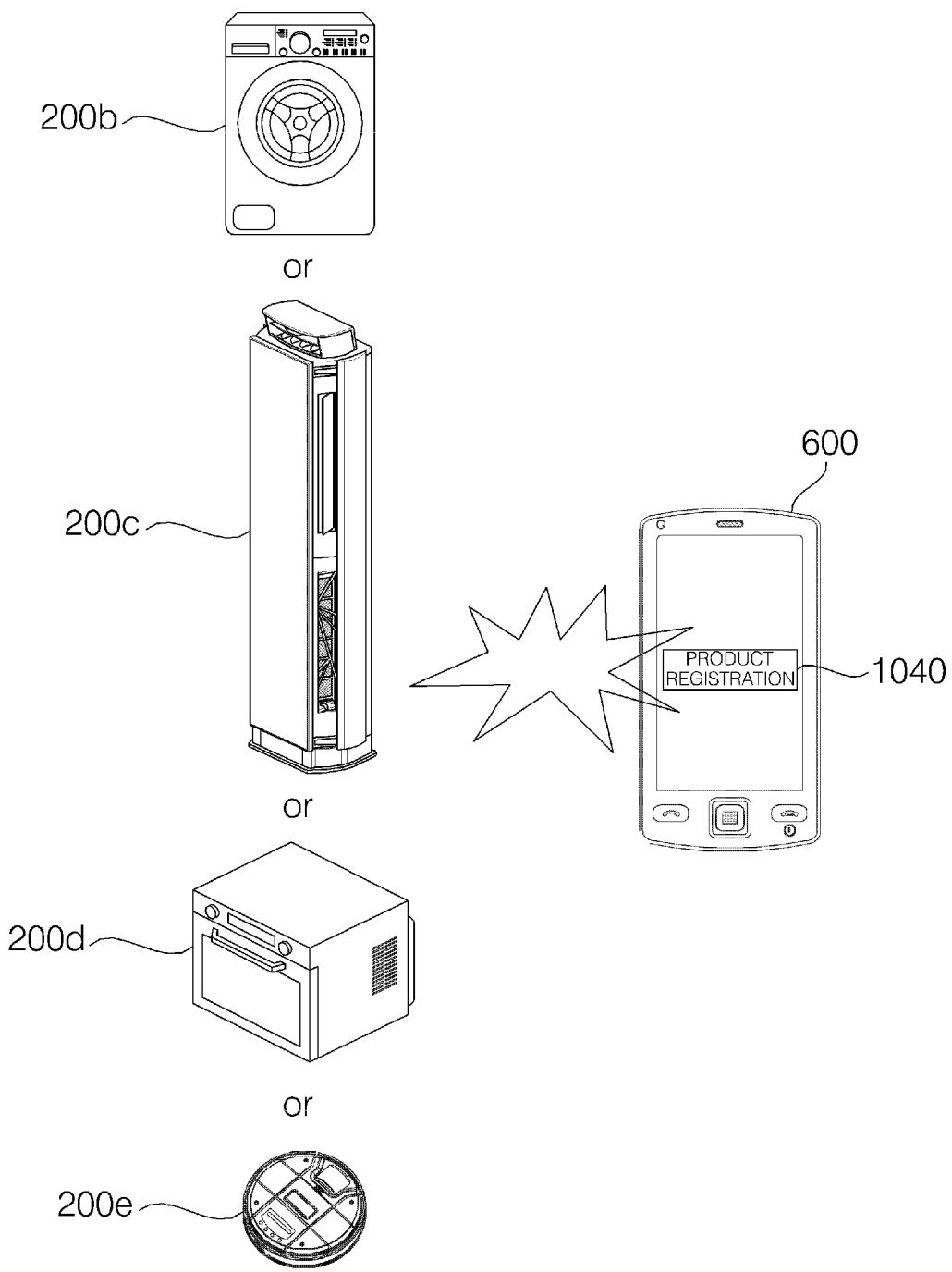
FIG. 13A illustrates the mobile terminal approaching exemplary home appliances.

FIG. 13a shows the case in which the mobile terminal 600 approaches the washing machine 200b, the air conditioner 200c, the cooker 200d or the cleaner 200e within a predetermined distance in a state in which the product registration screen 1040 among the home appliance related application screens is displayed, that is, the case in which tagging is performed.

Figure 13B:
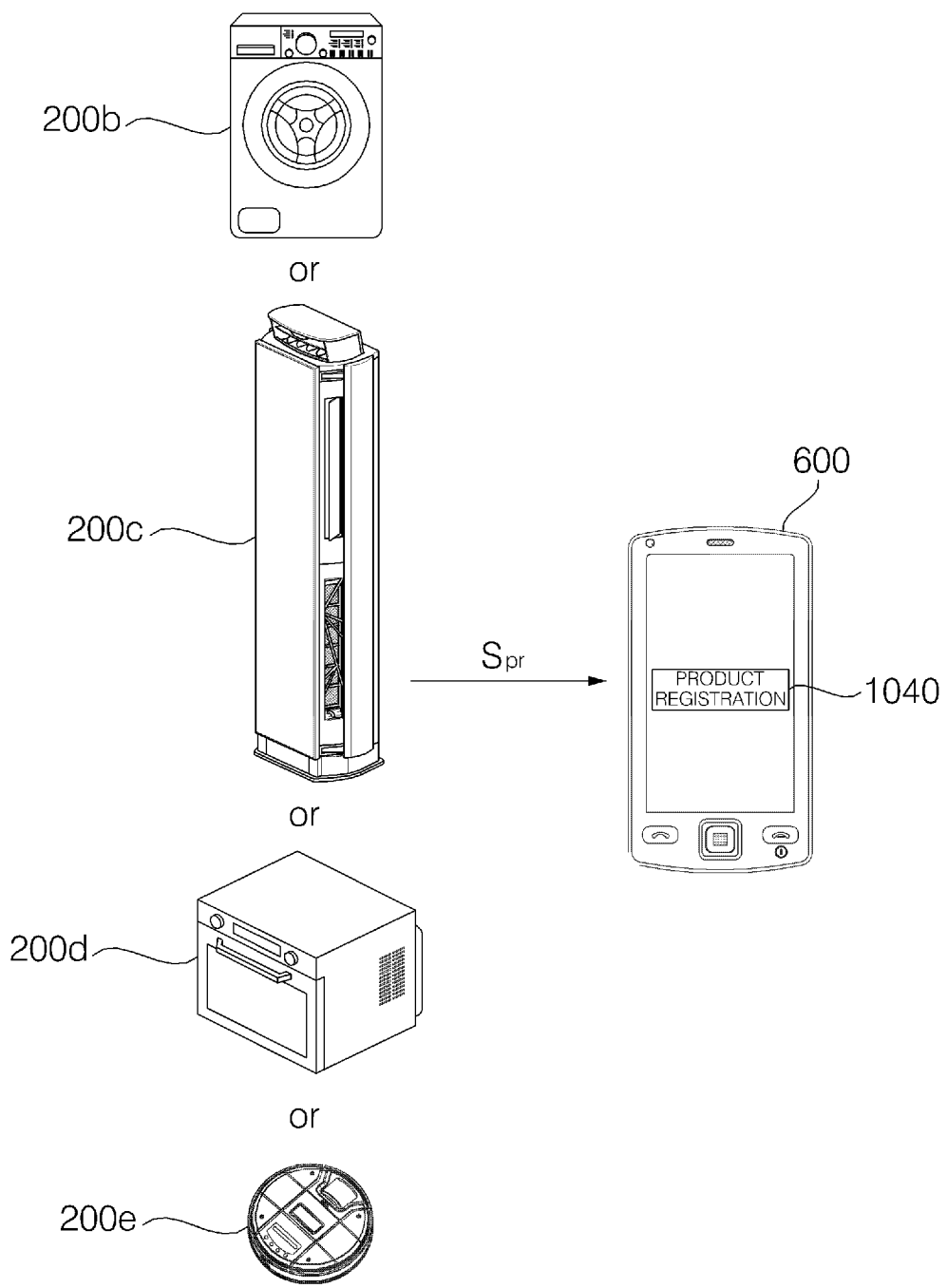
FIG. 13B illustrates the mobile terminal receiving product information from the exemplary home appliances.

As shown in FIG. 13b, the mobile terminal 600 may receive the product information Spr from the NFC module 217 of the washing machine 200b, the air conditioner 200c, the cooker 200d or the cleaner 200e. The product information may include product type information, product manufacture date information, a product serial number, etc.

Figure 13C:
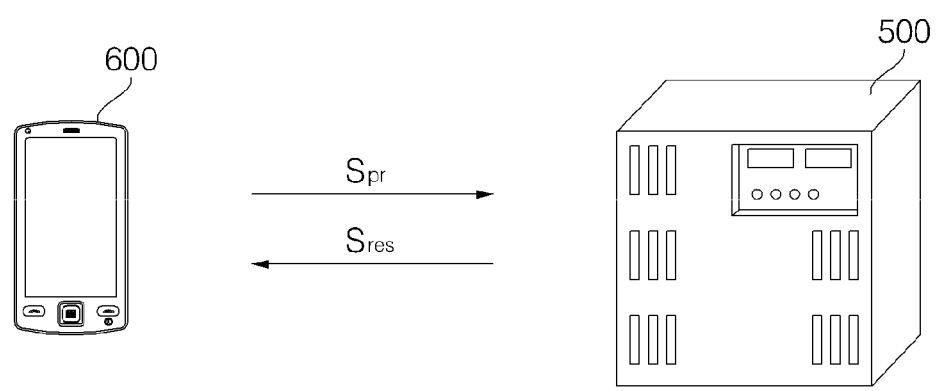
FIG. 13C illustrates the mobile terminal transmitting product information to the server.

FIG. 13c shows the case in which the mobile terminal 600 transmits the received product information Spr to the server 500 and the server 500 transmits the product registration result information Sres to the mobile terminal 600.

The server 500 may conveniently complete product registration using the received product information Spr. Accordingly, it is possible to conveniently perform product registration via NFC with respect to various home appliances.

Figure 13D:
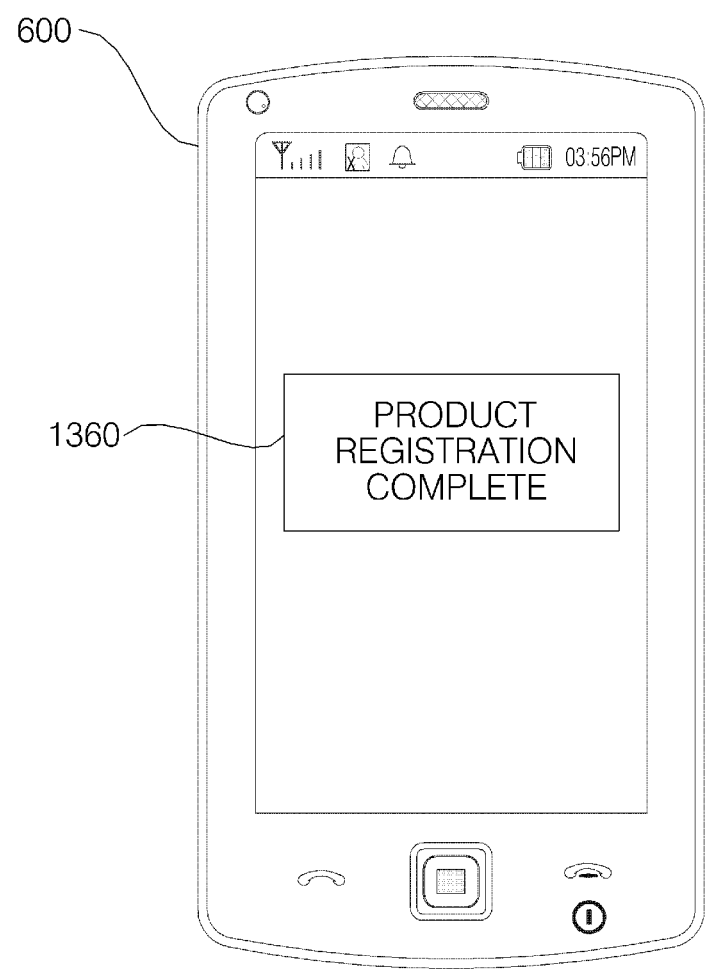
FIG. 13D illustrates a screen after product registration is complete.

The mobile terminal 600 may display the product registration completion result screen 1360 as shown in FIG. 13d. The product registration completion result screen 1360 may include a home screen movement screen, similarly to FIG. 10h. As shown in FIG. 10h, if the movement item 1067 is selected from the home screen movement screen 1065, as shown in FIG. 10a, the login screen 1010 among the home application related application screens may be displayed.

According to the embodiment of the present invention, the mobile terminal receives the product information of the home appliance from the home appliance based on tagging to the home appliance and transmits the received product information to the server. Accordingly, it is possible to conveniently perform product registration of the home appliance. Therefore, it is possible to increase user convenience.

The mobile terminal receives the product registration result information from the server and displays the product registration result information, such that the user can conveniently recognize that product registration has been completed.

In particular, if the mobile terminal is tagged to the home appliance in a state of displaying the product registration screen, it is possible to conveniently receive the product information and to easily perform product registration.

In order to transmit the product information to the server, the list of adjacent access point devices is displayed and any one access point device is selected from the list. Thus, it is possible to conveniently and rapidly transmit the product information to the server.

According to the embodiment of the present invention, the home appliance stores the product information and transmits the product information to the mobile terminal upon tagging to the mobile terminal. Accordingly, it is possible to provide an environment in which product registration of the home appliance can be conveniently performed.

In particular, since the home appliance checks the identifier information of the NFC module when the home appliance is powered on and stores the product information of the home appliance in the NFC module, it is possible to rapidly transmit the product information to the mobile terminal upon tagging to the mobile terminal.

The mobile terminal, the home appliance and the method for operating the same according to the foregoing embodiments are not restricted to the embodiments set forth herein. Therefore, variations and combinations of the exemplary embodiments set forth herein may fall within the scope of the present invention.

The method for operating the mobile terminal or the home appliance of present invention may be implemented as code that can be written to a computer-readable recording medium and can thus be read by a processor included in an image display apparatus. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating a mobile terminal, the method comprising:
   accessing a server;
   downloading a home appliance related application from the server;
   installing the home appliance related application in the mobile terminal;
   in response to an execution input for the home appliance related application, executing the home appliance application;
   performing login to the server during the executing of the home appliance related application;
   displaying a product registration screen according to selection of a product registration item of the home appliance related application;
   performing tagging to a home appliance;
   receiving product information of the home appliance from the home appliance based on the tagging;
   in response to the receiving of the product information of the home appliance, changing a reception flag for notifying that the home appliance product information has been received;
   transmitting the product information to the server;
   receiving a request for transmission of user information from the server; and
   transmitting the user information from the mobile terminal to the server;
   receiving product registration result information from the server;
   displaying the product registration result information; and
   receiving state information of the home appliance if the tagging to the home appliance is performed when the home appliance is out of order,
   wherein the state information includes information about a part which does not operate upon failure, failure time information, and/or operation information upon failure.

2. The method according to claim 1, further comprising displaying an object indicating whether product registration is performed according to the receiving of the product information if the product information of the home appliance is received.

3. The method according to claim 1, further comprising:
   displaying a list of adjacent access point devices, in order to transmit the product information to the server; and
   selecting any one access point device from the list,
   wherein transmission of the product information to the server is performed using the selected access point device.

4. The method according to claim 1, further comprising:
   if the user information is not stored in the mobile terminal, displaying a screen for user information input.

5. The method according to claim 1, wherein the transmitting the user information includes transmitting the user information pre-stored in the mobile terminal if user information transmission is accepted.

6. A mobile terminal comprising:
   a display;
   a near field communication (NFC) module configured to receive product information of a home appliance by tagging to the home appliance;
   a communication module configured to perform data communication with a server; and
   a controller configured;
   access a server;
   download a home appliance related application from the server;

install the home appliance related application in the mobile terminal;
in response to an execution input of the home appliance related application, execute the home appliance related application;
perform login to the server during the execution of the home appliance related application;
display a product registration screen according to selection of a product registration item of the executed home appliance related application;
receive the product information of the home a through the NEC module;
transmit the product information to the server;
receive product registration result information from the server;
display the product registration result information; and
receive state information of the home appliance if a tagging of the home appliance is performed when the home appliance is out of order,
wherein the state information includes information about a part which does not operate upon failure, failure time information, and/or operation information upon failure.

7. The mobile terminal according to claim 6, wherein the controller executes a home appliance related application and, if a product registration item of the application is selected, controls display of a product registration screen corresponding to the selected product registration item.

8. The mobile terminal according to claim 6, wherein, if the product information of the home appliance is received, the controller controls display of an object indicating whether product registration is performed according to product information reception.

9. The mobile terminal according to claim 6, wherein:
the display displays a list of adjacent access point devices in order to transmit the product information to the server, and
if any one access point device is selected from the list, the controller controls transmission of the product information to the server using the selected access point device.

10. The mobile terminal according to claim 6, wherein if the user information is not stored in the mobile terminal, the controller of the mobile terminal controls the display to display a screen for user information input.

11. The mobile terminal according to claim 6,
wherein the NFC module includes:
a memory to store the product information received from the home appliance;
an NFC controller to, in response to the receiving of the product information of the home appliance, change a reception notifying to the controller that the home appliance product information has been received,
wherein the communication module:
receives a request for transmission of user information from the server; and
transmits the user information from the server.

* * * * *